(12) United States Patent
Vorbach et al.

(10) Patent No.: US 8,058,899 B2
(45) Date of Patent: Nov. 15, 2011

(54) LOGIC CELL ARRAY AND BUS SYSTEM

(76) Inventors: Martin Vorbach, München (DE); Frank May, München (DE); Dirk Reichardt, München (DE); Frank Lier, München (DE); Gerd Ehlers, Grasbrunn (DE); Armin Nückel, Neupotz (DE); Volker Baumgarte, München (DE); Prashant Rao, München (DE); Jens Oertel, Bad Bergazabern (DE)

( * ) Notice: Subject to any disclaimer, the term of this patent is extended or adjusted under 35 U.S.C. 154(b) by 0 days.

(21) Appl. No.: 12/371,040

(22) Filed: Feb. 13, 2009

(65) Prior Publication Data

US 2009/0146691 A1 Jun. 11, 2009

Related U.S. Application Data

(63) Continuation of application No. 10/398,546, filed as application No. PCT/EP01/11593 on Oct. 8, 2001, now Pat. No. 7,595,659.

(60) Provisional application No. 60/238,855, filed on Oct. 6, 2000.

(30) Foreign Application Priority Data

| Mar. 5, 2001 | (DE) | 101 10 530 |
|---|---|---|
| Mar. 7, 2001 | (DE) | 101 11 014 |
| Jul. 24, 2001 | (DE) | 101 35 210 |
| Jul. 24, 2001 | (DE) | 101 35 211 |
| Aug. 16, 2001 | (DE) | 101 39 170 |
| Aug. 29, 2001 | (DE) | 101 42 231 |
| Sep. 3, 2001 | (DE) | 101 42 894 |
| Sep. 3, 2001 | (DE) | 101 42 903 |
| Sep. 3, 2001 | (DE) | 101 42 904 |
| Sep. 11, 2001 | (DE) | 101 44 732 |
| Sep. 11, 2001 | (DE) | 101 44 733 |
| Sep. 17, 2001 | (DE) | 101 45 792 |
| Sep. 17, 2001 | (DE) | 101 45 795 |
| Sep. 19, 2001 | (DE) | 101 46 132 |

(51) Int. Cl.
*H03K 19/199* (2006.01)
*G06F 7/52* (2006.01)

(52) U.S. Cl. ............... 326/39; 326/38; 326/41; 708/620; 708/501

(58) Field of Classification Search ............. 326/38–41; 708/490, 503, 505, 620, 670
See application file for complete search history.

(56) References Cited

U.S. PATENT DOCUMENTS 2,067,477 A 1/1937 Cooper
(Continued)

FOREIGN PATENT DOCUMENTS

DE 42 21 278 1/1994
(Continued)

OTHER PUBLICATIONS

Abnous et al., "Ultra-Low-Power Domain-Specific Multimedia Processors," U.C. Berkeley, 1996 IEEE, pp. 461-470.
(Continued)

*Primary Examiner* — Vibol Tan
(74) *Attorney, Agent, or Firm* — Kenyon & Kenyon LLP

(57) ABSTRACT

A logic cell array having a number of logic cells and a segmented bus system for logic cell communication, the bus system including different segment lines having shorter and longer segments for connecting two points in order to be able to minimize the number of bus elements traversed between separate communication start and end points.

82 Claims, 11 Drawing Sheets

U.S. PATENT DOCUMENTS

| | | |
|---|---|---|
| 3,242,998 A | 3/1966 | Gubbins |
| 3,564,506 A | 2/1971 | Bee et al. |
| 3,681,578 A | 8/1972 | Stevens |
| 3,753,008 A | 8/1973 | Guarnaschelli |
| 3,757,608 A | 9/1973 | Willner |
| 3,855,577 A | 12/1974 | Vandierendonck |
| 4,151,611 A | 4/1979 | Sugawara et al. |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,594,682 A | 6/1986 | Drimak |
| 4,623,997 A | 11/1986 | Tulpule |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,791,603 A | 12/1988 | Henry |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,873,666 A | 10/1989 | Lefebvre et al. |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,939,641 A | 7/1990 | Schwartz et al. |
| 4,959,781 A | 9/1990 | Rubinstein et al. |
| 4,967,340 A | 10/1990 | Dawes |
| 4,972,314 A | 11/1990 | Getzinger et al. |
| 4,992,933 A | 2/1991 | Taylor |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,036,473 A | 7/1991 | Butts et al. |
| 5,036,493 A | 7/1991 | Nielsen |
| 5,041,924 A | 8/1991 | Blackborow et al. |
| 5,043,978 A | 8/1991 | Nagler et al. |
| 5,047,924 A | 9/1991 | Matsubara et al. |
| 5,055,997 A | 10/1991 | Sluijter et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,103,311 A | 4/1992 | Sluijter et al. |
| 5,109,503 A | 4/1992 | Cruickshank et al. |
| 5,113,498 A | 5/1992 | Evan et al. |
| 5,115,510 A | 5/1992 | Okamoto et al. |
| 5,119,290 A | 6/1992 | Loo et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,182,474 A | 1/1993 | Kaneko |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,212,777 A | 5/1993 | Gove et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,243,238 A | 9/1993 | Kean |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,511 A | 2/1994 | Robinson et al. |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,355,508 A | 10/1994 | Kan |
| 5,361,373 A | 11/1994 | Gilson |
| 5,365,125 A | 11/1994 | Goetting et al. |
| 5,379,444 A | 1/1995 | Mumme |
| 5,386,154 A | 1/1995 | Goetting et al. |
| 5,386,518 A | 1/1995 | Reagle et al. |
| 5,392,437 A | 2/1995 | Matter et al. |
| 5,408,643 A | 4/1995 | Katayose |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,435,000 A | 7/1995 | Boothroyd et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,450,022 A | 9/1995 | New |
| 5,455,525 A | 10/1995 | Ho et al. |
| 5,457,644 A * | 10/1995 | McCollum .................... 708/230 |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,504,439 A | 4/1996 | Tavana |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |

| | | | | | | |
|---|---|---|---|---|---|---|
| 5,537,580 A | 7/1996 | Giomi et al. | 5,754,871 A | 5/1998 | Wilkinson et al. | |
| 5,537,601 A | 7/1996 | Kimura et al. | 5,760,602 A | 6/1998 | Tan | |
| 5,541,530 A | 7/1996 | Cliff et al. | 5,761,484 A | 6/1998 | Agarwal et al. | |
| 5,544,336 A | 8/1996 | Kato et al. | 5,773,994 A | 6/1998 | Jones | |
| 5,548,773 A | 8/1996 | Kemeny et al. | 5,778,439 A | 7/1998 | Trimberger et al. | |
| 5,550,782 A | 8/1996 | Cliff et al. | 5,781,756 A | 7/1998 | Hung | |
| 5,555,434 A | 9/1996 | Carlstedt | 5,784,636 A | 7/1998 | Rupp | |
| 5,559,450 A | 9/1996 | Ngai et al. | 5,794,059 A | 8/1998 | Barker et al. | |
| 5,561,738 A | 10/1996 | Kinerk et al. | 5,794,062 A | 8/1998 | Baxter | |
| 5,568,624 A | 10/1996 | Sites et al. | 5,801,547 A | 9/1998 | Kean | |
| 5,570,040 A | 10/1996 | Lytle et al. | 5,801,715 A | 9/1998 | Norman | |
| 5,572,710 A | 11/1996 | Asano et al. | 5,801,958 A | 9/1998 | Dangelo et al. | |
| 5,574,930 A | 11/1996 | Halverson, Jr. et al. | 5,802,290 A | 9/1998 | Casselman | |
| 5,581,731 A | 12/1996 | King et al. | 5,804,986 A | 9/1998 | Jones | |
| 5,581,734 A | 12/1996 | DiBrino et al. | 5,815,004 A | 9/1998 | Trimberger et al. | |
| 5,583,450 A | 12/1996 | Trimberger et al. | 5,815,715 A | 9/1998 | Kucukcakar | |
| 5,584,013 A | 12/1996 | Cheong et al. | 5,815,726 A * | 9/1998 | Cliff .................................. | 712/1 |
| 5,586,044 A | 12/1996 | Agrawal et al. | 5,821,774 A | 10/1998 | Veytsman et al. | |
| 5,587,921 A | 12/1996 | Agrawal et al. | 5,828,229 A | 10/1998 | Cliff et al. | |
| 5,588,152 A | 12/1996 | Dapp et al. | 5,828,858 A | 10/1998 | Athanas et al. | |
| 5,590,345 A | 12/1996 | Barker et al. | 5,831,448 A | 11/1998 | Kean | |
| 5,590,348 A | 12/1996 | Phillips et al. | 5,832,288 A | 11/1998 | Wong | |
| 5,596,742 A | 1/1997 | Agarwal et al. | 5,838,165 A | 11/1998 | Chatter | |
| 5,600,265 A | 2/1997 | El Gamal et al. | 5,841,973 A | 11/1998 | Kessler et al. | |
| 5,600,597 A | 2/1997 | Kean et al. | 5,844,422 A | 12/1998 | Trimberger et al. | |
| 5,600,845 A | 2/1997 | Gilson | 5,844,888 A | 12/1998 | Markkula, Jr. et al. | |
| 5,606,698 A | 2/1997 | Powell | 5,848,238 A | 12/1998 | Shimomura et al. | |
| 5,608,342 A | 3/1997 | Trimberger | 5,854,918 A | 12/1998 | Baxter | |
| 5,611,049 A | 3/1997 | Pitts | 5,857,097 A | 1/1999 | Henzinger et al. | |
| 5,617,547 A | 4/1997 | Feeney et al. | 5,857,109 A | 1/1999 | Taylor | |
| 5,617,577 A | 4/1997 | Barker et al. | 5,859,544 A | 1/1999 | Norman | |
| 5,619,720 A | 4/1997 | Garde et al. | 5,860,119 A | 1/1999 | Dockser | |
| 5,625,806 A | 4/1997 | Kromer | 5,862,403 A | 1/1999 | Kanai et al. | |
| 5,625,836 A | 4/1997 | Barker et al. | 5,865,239 A | 2/1999 | Carr | |
| 5,627,992 A | 5/1997 | Baror | 5,867,691 A | 2/1999 | Shiraishi | |
| 5,634,131 A | 5/1997 | Matter et al. | 5,867,723 A | 2/1999 | Chin et al. | |
| 5,635,851 A | 6/1997 | Tavana | 5,870,620 A | 2/1999 | Kadosumi et al. | |
| 5,642,058 A | 6/1997 | Trimberger et al. | 5,884,075 A | 3/1999 | Hester et al. | |
| 5,646,544 A | 7/1997 | Iadanza | 5,887,162 A | 3/1999 | Williams et al. | |
| 5,646,545 A | 7/1997 | Trimberger et al. | 5,887,165 A | 3/1999 | Martel et al. | |
| 5,649,176 A | 7/1997 | Selvidge et al. | 5,889,533 A | 3/1999 | Lee | |
| 5,649,179 A | 7/1997 | Steenstra et al. | 5,889,982 A | 3/1999 | Rodgers et al. | |
| 5,652,529 A | 7/1997 | Gould et al. | 5,892,370 A | 4/1999 | Eaton et al. | |
| 5,652,894 A | 7/1997 | Hu et al. | 5,892,961 A | 4/1999 | Trimberger | |
| 5,655,069 A | 8/1997 | Ogawara et al. | 5,892,962 A | 4/1999 | Cloutier | |
| 5,655,124 A | 8/1997 | Lin | 5,894,565 A | 4/1999 | Furtek et al. | |
| 5,656,950 A | 8/1997 | Duong et al. | 5,898,602 A | 4/1999 | Rothman et al. | |
| 5,657,330 A | 8/1997 | Matsumoto | 5,901,279 A | 5/1999 | Davis, III | |
| 5,659,785 A | 8/1997 | Pechanek et al. | 5,915,099 A | 6/1999 | Takata et al. | |
| 5,659,797 A | 8/1997 | Zandveld et al. | 5,915,123 A * | 6/1999 | Mirsky et al. ................... | 712/16 |
| 5,675,262 A | 10/1997 | Duong et al. | 5,924,119 A | 7/1999 | Sindhu et al. | |
| 5,675,743 A | 10/1997 | Mavity | 5,926,638 A | 7/1999 | Inoue | |
| 5,675,757 A | 10/1997 | Davidson et al. | 5,927,423 A | 7/1999 | Wada et al. | |
| 5,675,777 A | 10/1997 | Glickman | 5,933,023 A | 8/1999 | Young | |
| 5,680,583 A | 10/1997 | Kuijsten | 5,933,642 A | 8/1999 | Baxter et al. | |
| 5,682,491 A | 10/1997 | Pechanek et al. | 5,936,424 A | 8/1999 | Young et al. | |
| 5,687,325 A | 11/1997 | Chang | 5,943,242 A | 8/1999 | Vorbach et al. | |
| 5,694,602 A | 12/1997 | Smith | 5,956,518 A | 9/1999 | DeHon et al. | |
| 5,696,791 A | 12/1997 | Yeung | 5,960,193 A | 9/1999 | Guttag et al. | |
| 5,696,976 A | 12/1997 | Nizar et al. | 5,960,200 A | 9/1999 | Eager et al. | |
| 5,701,091 A | 12/1997 | Kean | 5,966,143 A | 10/1999 | Breternitz, Jr. | |
| 5,705,938 A | 1/1998 | Kean | 5,966,534 A | 10/1999 | Cooke et al. | |
| 5,706,482 A | 1/1998 | Matsushima et al. | 5,970,254 A | 10/1999 | Cooke et al. | |
| 5,713,037 A | 1/1998 | Wilkinson et al. | 5,978,260 A | 11/1999 | Trimberger et al. | |
| 5,717,890 A | 2/1998 | Ichida et al. | 5,978,583 A | 11/1999 | Ekanadham et al. | |
| 5,717,943 A | 2/1998 | Barker et al. | 5,996,048 A | 11/1999 | Cherabuddi et al. | |
| 5,732,209 A | 3/1998 | Vigil et al. | 5,996,083 A | 11/1999 | Gupta et al. | |
| 5,734,869 A | 3/1998 | Chen | 5,999,990 A | 12/1999 | Sharrit et al. | |
| 5,734,921 A | 3/1998 | Dapp et al. | 6,003,143 A | 12/1999 | Kim et al. | |
| 5,737,516 A | 4/1998 | Circello et al. | 6,011,407 A | 1/2000 | New | |
| 5,737,565 A | 4/1998 | Mayfield | 6,014,509 A | 1/2000 | Furtek et al. | |
| 5,742,180 A | 4/1998 | Detton et al. | 6,020,758 A | 2/2000 | Patel et al. | |
| 5,745,734 A | 4/1998 | Craft et al. | 6,020,760 A | 2/2000 | Sample et al. | |
| 5,748,872 A | 5/1998 | Norman | 6,021,490 A | 2/2000 | Vorbach et al. | |
| 5,748,979 A | 5/1998 | Trimberger | 6,023,564 A | 2/2000 | Trimberger | |
| 5,752,035 A | 5/1998 | Trimberger | 6,023,742 A | 2/2000 | Ebeling et al. | |
| 5,754,459 A | 5/1998 | Telikepalli | 6,026,481 A | 2/2000 | New et al. | |
| 5,754,820 A | 5/1998 | Yamagami | 6,034,538 A | 3/2000 | Abramovici | |
| 5,754,827 A | 5/1998 | Barbier et al. | 6,035,371 A | 3/2000 | Magloire | |

| Patent No. | Kind | Date | Inventor |
|---|---|---|---|
| 6,038,650 | A | 3/2000 | Vorbach et al. |
| 6,038,656 | A | 3/2000 | Cummings et al. |
| 6,044,030 | A | 3/2000 | Zheng et al. |
| 6,047,115 | A | 4/2000 | Mohan et al. |
| 6,049,222 | A | 4/2000 | Lawman |
| 6,049,866 | A | 4/2000 | Earl |
| 6,052,773 | A | 4/2000 | DeHon et al. |
| 6,054,873 | A | 4/2000 | Laramie |
| 6,055,619 | A | 4/2000 | North et al. |
| 6,058,469 | A | 5/2000 | Baxter |
| 6,076,157 | A | 6/2000 | Borkenhagen et al. |
| 6,077,315 | A | 6/2000 | Greenbaum et al. |
| 6,078,736 | A | 6/2000 | Guccione |
| 6,081,903 | A | 6/2000 | Vorbach et al. |
| 6,084,429 | A | 7/2000 | Trimberger |
| 6,085,317 | A | 7/2000 | Smith |
| 6,086,628 | A | 7/2000 | Dave et al. |
| 6,088,795 | A | 7/2000 | Vorbach et al. |
| 6,092,174 | A | 7/2000 | Roussakov |
| 6,096,091 | A | 8/2000 | Hartmann |
| 6,105,105 | A | 8/2000 | Trimberger et al. |
| 6,105,106 | A | 8/2000 | Manning |
| 6,108,760 | A | 8/2000 | Mirsky et al. |
| 6,118,724 | A | 9/2000 | Higginbottom |
| 6,119,181 | A | 9/2000 | Vorbach et al. |
| 6,122,719 | A | 9/2000 | Mirsky et al. |
| 6,125,408 | A | 9/2000 | McGee et al. |
| 6,127,908 | A | 10/2000 | Bozler et al. |
| 6,128,720 | A | 10/2000 | Pechanek et al. |
| 6,134,166 | A | 10/2000 | Lytle et al. |
| 6,137,307 | A | 10/2000 | Iwanczuk et al. |
| 6,435,054 | B1 | 10/2000 | Nguyen |
| 6,145,072 | A | 11/2000 | Shams et al. |
| 6,150,837 | A | 11/2000 | Beal et al. |
| 6,150,839 | A | 11/2000 | New et al. |
| 6,154,048 | A | 11/2000 | Iwanczuk et al. |
| 6,154,049 | A | 11/2000 | New |
| 6,157,214 | A | 12/2000 | Marshall |
| 6,170,051 | B1 | 1/2001 | Dowling |
| 6,172,520 | B1 | 1/2001 | Lawman et al. |
| 6,173,419 | B1 | 1/2001 | Barnett |
| 6,173,434 | B1 | 1/2001 | Wirthlin et al. |
| 6,178,494 | B1 | 1/2001 | Casselman |
| 6,185,256 | B1 | 2/2001 | Saito et al. |
| 6,185,731 | B1 | 2/2001 | Maeda et al. |
| 6,188,240 | B1 | 2/2001 | Nakaya |
| 6,188,650 | B1 | 2/2001 | Hamada et al. |
| 6,198,304 | B1 | 3/2001 | Sasaki |
| 6,201,406 | B1 | 3/2001 | Iwanczuk et al. |
| 6,202,182 | B1 | 3/2001 | Abramovici et al. |
| 6,204,687 | B1 | 3/2001 | Schultz et al. |
| 6,211,697 | B1 | 4/2001 | Lien et al. |
| 6,212,544 | B1 | 4/2001 | Borkenhagen et al. |
| 6,212,650 | B1 | 4/2001 | Guccione |
| 6,215,326 | B1 | 4/2001 | Jefferson et al. |
| 6,216,223 | B1 | 4/2001 | Revilla et al. |
| 6,219,833 | B1 | 4/2001 | Solomon et al. |
| RE37,195 | E | 5/2001 | Kean |
| 6,230,307 | B1 | 5/2001 | Davis et al. |
| 6,240,502 | B1 | 5/2001 | Panwar et al. |
| 6,243,808 | B1 | 6/2001 | Wang |
| 6,247,147 | B1 | 6/2001 | Beenstra et al. |
| 6,252,792 | B1 | 6/2001 | Marshall et al. |
| 6,256,724 | B1 | 7/2001 | Hocevar et al. |
| 6,260,114 | B1 | 7/2001 | Schug |
| 6,260,179 | B1 | 7/2001 | Ohsawa et al. |
| 6,262,908 | B1 | 7/2001 | Marshall et al. |
| 6,263,430 | B1 | 7/2001 | Trimberger et al. |
| 6,266,760 | B1 | 7/2001 | DeHon et al. |
| 6,279,077 | B1 | 8/2001 | Nasserbakht et al. |
| 6,282,627 | B1 | 8/2001 | Wong et al. |
| 6,282,701 | B1 | 8/2001 | Wygodny et al. |
| 6,285,624 | B1 | 9/2001 | Chen |
| 6,286,134 | B1 | 9/2001 | Click, Jr. et al. |
| 6,288,566 | B1 | 9/2001 | Hanrahan et al. |
| 6,289,440 | B1 | 9/2001 | Casselman |
| 6,298,043 | B1 | 10/2001 | Mauger et al. |
| 6,298,396 | B1 | 10/2001 | Loyer et al. |
| 6,298,472 | B1 | 10/2001 | Phillips et al. |
| 6,301,706 | B1 | 10/2001 | Maslennikov et al. |
| 6,311,200 | B1 | 10/2001 | Hanrahan et al. |
| 6,311,265 | B1 | 10/2001 | Beckerle et al. |
| 6,321,298 | B1 | 11/2001 | Hubis |
| 6,321,366 | B1 | 11/2001 | Tseng et al. |
| 6,321,373 | B1 | 11/2001 | Ekanadham et al. |
| 6,338,106 | B1 | 1/2002 | Vorbach et al. |
| 6,339,840 | B1 | 1/2002 | Kothari et al. |
| 6,341,318 | B1 | 1/2002 | Dakhil |
| 6,347,346 | B1 | 2/2002 | Taylor |
| 6,349,346 | B1 | 2/2002 | Hanrahan et al. |
| 6,353,841 | B1 | 3/2002 | Marshall et al. |
| 6,362,650 | B1 | 3/2002 | New et al. |
| 6,370,596 | B1 | 4/2002 | Dakhil |
| 6,373,779 | B1 | 4/2002 | Pang et al. |
| 6,374,286 | B1 | 4/2002 | Gee |
| 6,378,068 | B1 | 4/2002 | Foster et al. |
| 6,381,624 | B1 | 4/2002 | Colon-Bonet et al. |
| 6,389,379 | B1 | 5/2002 | Lin et al. |
| 6,389,579 | B1 | 5/2002 | Phillips et al. |
| 6,392,912 | B1 | 5/2002 | Hanrahan et al. |
| 6,398,383 | B1 | 6/2002 | Huang |
| 6,400,601 | B1 | 6/2002 | Sudo et al. |
| 6,404,224 | B1 | 6/2002 | Azegami et al. |
| 6,405,185 | B1 | 6/2002 | Pechanek et al. |
| 6,405,299 | B1 | 6/2002 | Vorbach et al. |
| 6,421,808 | B1 | 7/2002 | McGeer |
| 6,421,809 | B1 | 7/2002 | Wuytack et al. |
| 6,421,817 | B1 | 7/2002 | Mohan et al. |
| 6,425,054 | B1 | 7/2002 | Nguyen |
| 6,425,068 | B1 | 7/2002 | Vorbach |
| 6,426,649 | B1 * | 7/2002 | Fu et al. ............. 326/41 |
| 6,427,156 | B1 | 7/2002 | Chapman et al. |
| 6,430,309 | B1 | 8/2002 | Pressman et al. |
| 6,434,642 | B1 | 8/2002 | Camilleri et al. |
| 6,434,672 | B1 | 8/2002 | Gaither |
| 6,434,695 | B1 | 8/2002 | Esfahani et al. |
| 6,434,699 | B1 | 8/2002 | Jones et al. |
| 6,437,441 | B1 | 8/2002 | Yamamoto |
| 6,438,747 | B1 | 8/2002 | Schreiber et al. |
| 6,449,283 | B1 | 9/2002 | Chao et al. |
| 6,457,116 | B1 * | 9/2002 | Mirsky et al. ............. 712/16 |
| 6,476,634 | B1 | 11/2002 | Bilski |
| 6,477,643 | B1 | 11/2002 | Vorbach et al. |
| 6,480,937 | B1 | 11/2002 | Vorbach et al. |
| 6,480,954 | B2 | 11/2002 | Trimberger et al. |
| 6,483,343 | B1 * | 11/2002 | Faith et al. ............. 326/40 |
| 6,487,709 | B1 | 11/2002 | Keller et al. |
| 6,490,695 | B1 | 12/2002 | Zagorski et al. |
| 6,496,902 | B1 | 12/2002 | Faanes et al. |
| 6,496,971 | B1 | 12/2002 | Lesea et al. |
| 6,504,398 | B1 | 1/2003 | Lien et al. |
| 6,507,898 | B1 | 1/2003 | Gibson et al. |
| 6,507,947 | B1 | 1/2003 | Schreiber et al. |
| 6,512,804 | B1 | 1/2003 | Johnson et al. |
| 6,513,077 | B2 | 1/2003 | Vorbach et al. |
| 6,516,382 | B2 | 2/2003 | Manning |
| 6,518,787 | B1 | 2/2003 | Allegrucci et al. |
| 6,519,674 | B1 | 2/2003 | Lam et al. |
| 6,523,107 | B1 | 2/2003 | Stansfield et al. |
| 6,525,678 | B1 | 2/2003 | Veenstra et al. |
| 6,526,520 | B1 | 2/2003 | Vorbach et al. |
| 6,538,468 | B1 | 3/2003 | Moore |
| 6,538,470 | B1 * | 3/2003 | Langhammer et al. ......... 326/41 |
| 6,539,415 | B1 | 3/2003 | Mercs |
| 6,539,438 | B1 | 3/2003 | Ledzius et al. |
| 6,539,477 | B1 | 3/2003 | Seawright |
| 6,542,394 | B2 | 4/2003 | Marshall et al. |
| 6,542,844 | B1 | 4/2003 | Hanna |
| 6,542,998 | B1 | 4/2003 | Vorbach |
| 6,553,395 | B2 | 4/2003 | Marshall et al. |
| 6,553,479 | B2 * | 4/2003 | Mirsky et al. ............. 712/16 |
| 6,567,834 | B1 | 5/2003 | Marshall et al. |
| 6,571,381 | B1 | 5/2003 | Vorbach et al. |
| 6,587,939 | B1 | 7/2003 | Takano |
| 6,598,128 | B1 | 7/2003 | Yoshioka et al. |
| 6,606,704 | B1 | 8/2003 | Adiletta et al. |
| 6,624,819 | B1 | 9/2003 | Lewis |
| 6,631,487 | B1 | 10/2003 | Abramovici et al. |

| | | | | | | |
|---|---|---|---|---|---|---|
| 6,633,181 | B1 | 10/2003 | Rupp | 2003/0046607 A1 | 3/2003 | Vorbach |
| 6,657,457 | B1 | 12/2003 | Hanrahan et al. | 2003/0052711 A1 | 3/2003 | Taylor |
| 6,658,564 | B1 | 12/2003 | Smith et al. | 2003/0055861 A1 | 3/2003 | Lai et al. |
| 6,665,758 | B1 | 12/2003 | Frazier et al. | 2003/0056062 A1 | 3/2003 | Prabhu |
| 6,668,237 | B1 | 12/2003 | Guccione et al. | 2003/0056085 A1 | 3/2003 | Vorbach |
| 6,681,388 | B1 | 1/2004 | Sato et al. | 2003/0056091 A1 | 3/2003 | Greenberg |
| 6,687,788 | B2 | 2/2004 | Vorbach et al. | 2003/0056202 A1 | 3/2003 | Vorbach |
| 6,697,979 | B1 | 2/2004 | Vorbach et al. | 2003/0061542 A1 | 3/2003 | Bates et al. |
| 6,704,816 | B1 | 3/2004 | Burke | 2003/0062922 A1 | 4/2003 | Douglass et al. |
| 6,708,325 | B2 | 3/2004 | Cooke et al. | 2003/0070059 A1 | 4/2003 | Dally et al. |
| 6,717,436 | B2 | 4/2004 | Kress et al. | 2003/0086300 A1 | 5/2003 | Noyes et al. |
| 6,721,830 | B2 | 4/2004 | Vorbach et al. | 2003/0093662 A1 | 5/2003 | Vorbach et al. |
| 6,725,334 | B2 | 4/2004 | Barroso et al. | 2003/0097513 A1 | 5/2003 | Vorbach et al. |
| 6,728,871 | B1 | 4/2004 | Vorbach et al. | 2003/0123579 A1 | 7/2003 | Safavi et al. |
| 6,745,317 | B1 * | 6/2004 | Mirsky et al. ............ 712/11 | 2003/0135686 A1 | 7/2003 | Vorbach et al. |
| 6,748,440 | B1 | 6/2004 | Lisitsa et al. | 2003/0154349 A1 | 8/2003 | Berg et al. |
| 6,751,722 | B2 * | 6/2004 | Mirsky et al. ............ 712/15 | 2003/0192032 A1 | 10/2003 | Andrade et al. |
| 6,754,805 | B1 | 6/2004 | Juan | 2004/0015899 A1 | 1/2004 | May et al. |
| 6,757,847 | B1 | 6/2004 | Farkash et al. | 2004/0025005 A1 | 2/2004 | Vorbach et al. |
| 6,757,892 | B1 | 6/2004 | Gokhale et al. | 2004/0039880 A1 | 2/2004 | Pentkovski et al. |
| 6,782,445 | B1 | 8/2004 | Olgiati et al. | 2004/0078548 A1 | 4/2004 | Claydon et al. |
| 6,785,826 | B1 | 8/2004 | Durham et al. | 2004/0168099 A1 | 8/2004 | Vorbach et al. |
| 6,802,026 | B1 | 10/2004 | Patterson et al. | 2004/0199688 A1 | 10/2004 | Vorbach et al. |
| 6,803,787 | B1 | 10/2004 | Wicker, Jr. | 2005/0066213 A1 | 3/2005 | Vorbach et al. |
| 6,820,188 | B2 | 11/2004 | Stansfield et al. | 2005/0091468 A1 | 4/2005 | Morita et al. |
| 6,829,697 | B1 | 12/2004 | Davis et al. | 2005/0144210 A1 | 6/2005 | Simkins et al. |
| 6,836,842 | B1 | 12/2004 | Guccione et al. | 2005/0144212 A1 | 6/2005 | Simkins et al. |
| 6,847,370 | B2 | 1/2005 | Baldwin et al. | 2005/0144215 A1 | 6/2005 | Simkins et al. |
| 6,868,476 | B2 | 3/2005 | Rosenbluth et al. | 2006/0036988 A1 | 2/2006 | Allen et al. |
| 6,871,341 | B1 | 3/2005 | Shyr | 2006/0230094 A1 | 10/2006 | Simkins et al. |
| 6,874,108 | B1 | 3/2005 | Abramovici et al. | 2006/0230096 A1 | 10/2006 | Thendean et al. |
| 6,886,092 | B1 | 4/2005 | Douglass et al. | 2007/0083730 A1 | 4/2007 | Vorbach et al. |
| 6,901,502 | B2 | 5/2005 | Yano et al. | 2008/0313383 A1 | 12/2008 | Morita et al. |
| 6,928,523 | B2 | 8/2005 | Yamada | 2009/0085603 A1 | 4/2009 | Paul et al. |
| 6,961,924 | B2 | 11/2005 | Bates et al. | 2010/0306602 A1 | 12/2010 | Kamiya et al. |
| 6,975,138 | B2 | 12/2005 | Pani et al. | | | |

FOREIGN PATENT DOCUMENTS

| | | |
|---|---|---|
| 6,977,649 B1 | 12/2005 | Baldwin et al. |
| 7,000,161 B1 | 2/2006 | Allen et al. |
| 7,007,096 B1 | 2/2006 | Lisita et al. |
| 7,010,667 B2 | 3/2006 | Vorbach et al. |
| 7,028,107 B2 | 4/2006 | Vorbach et al. |
| 7,036,114 B2 | 4/2006 | McWilliams et al. |
| 7,038,952 B1 | 5/2006 | Zack et al. |
| 7,043,416 B1 | 5/2006 | Lin |
| 7,210,129 B2 | 4/2007 | May et al. |
| 7,216,204 B2 | 5/2007 | Rosenbluth et al. |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 * | 3/2008 | Langhammer et al. ....... 708/625 |
| 7,350,178 B1 | 3/2008 | Crosland et al. |
| 7,382,156 B2 | 6/2008 | Pani et al. |
| 7,595,659 B2 | 9/2009 | Vorbach et al. |
| 7,650,448 B2 | 1/2010 | Vorbach et al. |
| 7,657,877 B2 | 2/2010 | Vorbach et al. |
| 7,759,968 B1 | 7/2010 | Hussein et al. |
| 2001/0001860 A1 | 5/2001 | Beiu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0010853 A1 | 1/2002 | Trimberger et al. |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0073282 A1 | 6/2002 | Chauvel et al. |
| 2002/0083308 A1 | 6/2002 | Pereira et al. |
| 2002/0099759 A1 | 7/2002 | Gootherts |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0152060 A1 | 10/2002 | Tseng |
| 2002/0156962 A1 | 10/2002 | Chopra et al. |
| 2002/0165886 A1 | 11/2002 | Lam |
| 2003/0001615 A1 | 1/2003 | Sueyoshi et al. |
| 2003/0014743 A1 | 1/2003 | Cooke et al. |

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 102 674 | 5/2001 |
| EP | 1 115 204 | 7/2001 |
| EP | 1 146 432 | 10/2001 |
| EP | 0 696 001 | 12/2001 |
| EP | 1 669 885 | 6/2006 |

| | | |
|---|---|---|
| FR | 2 752 466 | 2/1998 |
| GB | 2 304 438 | 3/1997 |
| JP | 58-58672 | 4/1983 |
| JP | 10-44571 | 2/1989 |
| JP | 1-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 6-266605 | 9/1994 |
| JP | 7-086921 | 3/1995 |
| JP | 7-154242 | 6/1995 |
| JP | 8-148989 | 6/1995 |
| JP | 8-44581 | 2/1996 |
| JP | 8-044581 | 2/1996 |
| JP | 08069447 | 3/1996 |
| JP | 8-101761 | 4/1996 |
| JP | 8-102492 | 4/1996 |
| JP | 8-221164 | 8/1996 |
| JP | 8-250685 | 9/1996 |
| JP | 9-27745 | 1/1997 |
| JP | 9-294069 | 11/1997 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2002-0033457 | 1/2002 |
| JP | 05-509184 | 12/2003 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 03/091875 | 11/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

Abnous, A., et al., "The Pleiades Architecture," Chapter I of *The Application of Programmable DSPs in Mobile Communications*, A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Albahama, O.T. et al., "On the Viability of FPGA-Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Arabi, et al., "PLD Integrates Dedicated High-speed Data Buffering, Complex State machine, and Fast Decode Array," conference record on WESCON '93, Sep. 28, 1993, pp. 432-436.
Athanas, "A Functional Reconfigurable Architecture and Compiler for Adoptive Computing," IEEE 1993, pp. 49-55.
Athanas, et al., "An Adaptive Hardware Machine Architecture and Compiler for Dynamic Processor Reconfigufation," IEEE, Laboratory for Engineering man/Machine Systems Division of Engineering, Box D, Brown University, Providence, Rhode Island, 1991, pp. 397-400.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Baumgarte, V. et al., PACT XPP "A Self-reconfigurable Data Processing Architecture," PACT Info. GMBH, Munchen Germany, 2001, 7 pages.
Beck et al., "From control flow to data flow," TR 89/1050, Oct. 1989, Dept. of Computer Science, Cornell University, Ithaca, NY, pp. 1-25.
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).
Becker et al., "Automatic Parallelism Exploitation for FPL-Based Accelerators." 1998, Proc. 31$^{st}$ Annual Hawaii International Conference on System Sciences, pp. 169-178.
Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.
Bittner, "Wormhole Run-time Reconfiguration: Conceptualization and VLSI Design of a High Performance Computing System," *Dissertation*, Jan. 23, 1997, pp. I-XX, 1-415.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cadambi, et al., "Managing Pipeline-reconfigurable FPGAs," ACM, 1998, pp. 55-64.
Callahan, et al., "The Garp Architecture and C Compiler," Computer, Apr. 2000, pp. 62-69.
Cardoso, J.M.P. et al., "A novel algorithm combining temporal partitioning and sharing of functional units," University of Algarve, Faro, Portugal, 2001 IEEE, pp. 1-10.
Cardoso, Joao M.P. and Markus Weinhardt,"XPP-VC: A C Compiler with Temporal Partitioning for the PACT-XPP Architecture," Field-Programmable Logic and Applications. Reconfigurable Computing is Going Mainstream, $12^{th}$ International Conference FPL 2002, Proceedings (Lecture Notes in Computer Science, vol. 2438) Springer-Verlag Berlin, Germany, 2002, pp. 864-874.
Cardoso, J.M.P. "Compilation of Java™ Algorithms onto Reconfigurable Computing Systems with Eploitation of Operation-Level Parallelism," Ph.D. Thesis, Universidade Tecnica de Lisboa (UTL), Lisbon, Portugal Oct. 2000 (Table of Contents and English Abstract only).
Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.
Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on Napa Valley, CA, USA, Apr. 21-23, 1999, IEEE Comput. Soc, US, (Apr. 21, 1999) pp. 2-11.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Compton, K. et al., "Configurable Computing: A Survey of Systems and Software," Northwestern University, Dept. of ECE, Technical Report, 1999, (XP-002315148), 39 pages.
Cook, Jeffrey J., "The Amalgam Compiler Infrastructure," Thesis at the University of Illinois at Urbana-Champaign (2004) Chapter 7 & Appendix G.
Cronquist, D. et al., Architecture Design of Reconfigurable Pipelined Datapaths, Department of Computer Science and Engineering, University of Washington, Seattle, WA, Proceedings of the $20^{th}$ Anniversary Conference on Advanced Research in VSLI, 1999, pp. 1-15.
DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.
DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Diniz, P., et al., "Automatic Synthesis of Data Storage and Control Structures for FPGA-based Computing Engines," 2000, IEEE, pp. 91-100.
Diniz, P., et al., "A behavioral synthesis estimation interface for configurable computing," University of Southern California, Marina Del Rey, CA, 2001 IEEE, pp. 1-2.
Donandt, "Improving Response Time of Programmable Logic Controllers by use of a Boolean Coprocessor," AEG Research Institute Berlin, IEEE, 1989, pp. 4-167-4-169.
Dutt, et al., "If Software is King for Systems-in-Silicon, What's New in Compilers?," IEEE, 1997, pp. 322-325.
Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator.com, 2001, 4 pages.
Fawcett, B.K., "Map, Place and Route: The Key to High-Density PLD Implementation," Wescon Conference, IEEE Center (Nov. 7, 1995) pp. 292-297.
Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.
Fornaciari, et al., System-level power evaluation metrics, 1997 Proceedings of the $2^{nd}$ Annual IEEE International Conference on Innovative Systems in Silicon, New York, NY, Oct. 1997, pp. 323-330.
Forstner, "Wer Zuerst Kommt, Mahlt Zuerst!: Teil 3: Einsatzgebiete and Anwendungbeispiele von FIFO-Speichern," Elektronik, Aug. 2000, pp. 104-109.
Franklin, Manoj et al., "A Fill-Unit Approach to Multiple Instruction Issue," Proceedings of the Annual International Symposium on Microarchitecture, Nov. 1994, pp. 162-171.
Freescale Slide Presentation, An Introduction to Motorola's RCF (Reconfigurable Compute Fabric) Technology, Presented by Frank David, Launched by Freescale Semiconductor, Inc., 2004, 39 pages.
Genius, D. et al., "A Case for Array Merging in Memory Hierarchies," Proceedings of the 9th International Workshop on Compilers for Parallel Computers, CPC'01 (Jun. 2001).
Gokhale, M.B.et al., "Automatic Allocation of Arrays to Memories in FPGA processors with Multiple Memory Banks," Field-Programmable Custom Computing Machines, 1999, IEEE, 6 pages.
Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.
Hartenstein, R. et al., "A new FPGA architecture for word-oriented datapaths," Proc. FPL'94, Springer LNCS, Sep. 1994, pp. 849.
Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.
Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).
Hauck, "The Roles of FPGAs in Reprogrammable Systems," IEEE, Apr. 1998, pp. 615-638.
Hauser, J.R., et al., "Garp: A MIPS Processor with a Reconfigurable Coprocessor," University of California, Berkeley, IEEE, 1997, pp. 24-33.
Hedge, S.J., "3D WASP Devices for On-line Signal and Data Processing," 1994, International Conference on Wafer Scale Integration, pp. 11-21.
Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.
Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4-p. 334.
Hwang, K., "Advanced Computer Architecture—Parallelism, Scalability, Programmability," 1993, McGraw-Hill, Inc., pp. 348-355.
Hwang, K., "Computer Architecture and Parallel Processing," Data Flow Computers and VLSI Computations, XP-002418655, 1985 McGraw-Hill, Chapter 10, pp. 732-807.
Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
IBM Technical Disclosure Bulletin, IBM Corp., New York, XP000424878, Bd. 36, Nr. 11, Nov. 1, 1993, pp. 335-336.

Inside DSP, "Ambric Discloses Massively Parallel Architecture," Aug. 23, 2006, HTTP://insidedsp.com/tabid/64/articleType/ArtieleView/articleId/155/Defa..., 2 pages.

Intel, Intel MXP5800/MXP5400 Digital Media Processors, Architecture Overview, Jun. 2004, Revision 2.4, pp. 1-24.

Iseli, C.,et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the $6^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, A., et al., "Practical Experiences with the SPARXIL Co-Processor," 1998, IEEE, pp. 394-398.

Koch, Andreas et al., "High-Level-Language Compilation for Reconfigurable Computers," Proceedings of European Workshop on Reconfigurable Communication-Centric SOCS (Jun. 2005) 8 pages.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the $15^{th}$ Annual International Symposium on Computer Architecture, May 30, 1998, pp. 252-260.

Larsen, S. et al., "Increasing and Detecting Memory Address Congruence," Proceedings of the 2002 IEEE International Conference on Parallel Architectures and Compilation Techniques (PACT'02), pp. 18-29 (Sep. 2002).

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield,C., "Logic that Mutates While-U-Wait," EDN (Bur. Ed) (USA), EDN (European Edition), Nov. 7, 1996, Cahners Publishing, USA, pp. 137-140, 142.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997).

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Myers, G. "Advances in Computer Architecture," Wiley-Interscience Publication, 2nd ed., John Wiley & Sons, Inc., 1978, pp. 463-494.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, $11^{th}$ International Conference, FPL 2001, Proceedings (Lecture Notes in Computer Science, vol. 2147) (2001) pp. 503-512.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Olukotun, K., "The Case for a Single-Chip Microprocessor," ACM Sigplan Notices, ACM, Association for Computing Machinery, New York, vol. 31, No. 9, Sep. 1996 pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

PACT Corporation, "The XPP Communication System," Technical Report 15 (2000).

Parhami, B., "Parallel Counters for Signed Binary Signals," Signals, Systems and Computers, 1989, Twenty-Third Asilomar Conference, vol. 1,pp. 513-516.

Piotrowski, A., "IEC-BUS, Die Funktionsweise des IEC-Bus unde seine Anwendung in Geräten and Systemen," 1987, Franzis-Verlag GmbH, München, pp. 20-25.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Razdan et al., A High-Performance Microarchitecture with Hardware-Programmable Functional Units, Micro-27, Proceedings of the $27^{th}$ Annual International Symposium on Microarchitecture, IEEE Computer Society and Association for Computing Machinery, Nov. 30-Dec. 2, 1994, pp. 172-180.

Saleeba, M. "A Self-Contained Dynamically Reconfigurable Processor Architecture," Sixteenth Australian Computer Science Conference, ASCS-16, QLD, Australia, Feb. 1993, pp. 59-70.

Saleeba, Z.M.G., "A Self-Reconfiguring Computer System," Department of Computer Science, Monash University (Dissertation) 1998, pp. 1-306.

Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.

Schmidt, H. et al., "Behavioral synthesis for FGPA-based computing," Carnegie Mellon University, Pittsburgh, PA, 1994 IEEE, pp. 125-132.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, C.,"Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the $3^{rd}$ Australian Computer Architecture Conference, Perth, John Morris, Ed., Feb. 2-3, 1998, pp. 169-178.

Simunic, et al., Source Code Optimization and Profiling of Energy Consumption in Embedded Systems, Proceedings of the $13^{th}$ International Symposium on System Synthesis, Sep. 2000, pp. 193-198.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Skokan, Z.E., "Programmable logic machine (A programmable cell array)," IEEE Journal of Solid-State Circuits, vol. 18, Issue 5, Oct. 1983, pp. 572-578.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Sutton et al., "A Multiprocessor DSP System Using PADDI-2," U.C. Berkeley, 1998 ACM, pp. 62-65.

Tau, E., et al., "A First Generation DPGA Implementation," *FPD '95*, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, PACT—A Technical Perspective, Mar. 27, 2002, pp. 1-27.

TMS320C54X DSP: CPU and Peripherals, Texas Instruments, 1996, 25 pages.

TMS320C54x DSP: Mnemonic Instruction Set, Texas Instruments, 1996, 342 pages.

Tsutsui, A., et al., "YARDS: FPGA/MPU Hybrid Architecture for Telecommunication Data Processing," NTT Optical Network Systems Laboratories, Japan, 1997 ACM, pp. 93-99.

Vasell et al., "The Function Processor: A Data-Driven Processor Array for Irregular Computations," Chalmers University of Technology, Sweden, pp. 1-21.

Villasenor, et al., "Configurable Computing Solutions for Automatic Target Recognition," *IEEE*, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Waingold, E, et al., "Baring it all to software: Raw machines," IEEE Computer, Sep. 1997, at 86-93.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Weinhardt, Markus et al., "Memory Access Optimization for Reconfigurable Systems," IEEE Proceedings Computers and Digital Techniques, 48(3) (May 2001).

Wittig, et al., "OneChip: An FPGA Processor with Reconfigurable Logic," IEEE, 1996, pp. 126-135.

Wolfe, M. et al., "High Performance Compilers for Parallel Computing" (Addison-Wesley 1996).

Wu, et al., "A New Cache Directory Scheme," IEEE, pp. 466-472, Jun. 1996.

Xu, H.Y. et al., "Parallel QR Factorization on a Block Data Flow Architecture," Conference Proceeding Article, Mar. 1, 1992, pp. 332-336 XP010255276, p. 333, Abstract 2.2, 2.3, 2.4-p. 334.

XILINX, "Logic Cell Array Families: XC4000, XC4000A and XC4000H," 1994, product description, pp. 2-7, 2-9, 2-14, 2-15, 8-16, and 9-14.

XILINX "Spartan and SpartanXL Families Field Programmable Gate Arrays," Jan. 1999, Xilinx, pp. 4-3 through 4-70.

XILINX, "XC6200 Field Programmable Gate Arrays," Apr. 24, 1997, Xilinx product description, pp. 1-73.

XILINX, "XC3000 Series Field Programmable Gate Arrays," Nov. 6, 1998, Xilinx product description, pp. 1-76.

XILINX, "XC4000E and XC4000X Series Field Programmable Gate Arrays," May 14, 1999, Xilinx product description, pp. 1-68.

XILINX, "Virtex-E 1.8 V Extended Memory Field Programmable Gate Arrays," Jul. 17, 2002, Xilinx Production Product Specification, pp. 1-118.

XILINX, "Virtex-II and Virtex-II Pro X FPGA User Guide," Mar. 28, 2007, Xilinx user guide, pp. 1-559.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley (2004), pp. 1-120.

Zima, H. et al., "Supercompilers for parallel and vector computers" (Addison-Wesley 1991).

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38th conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," XILINX, Inc., Section 2, pp. 1-240, Section 8, pp. 1, 23-25, 29, 45-52, 169-172 (1994).

U.S. Appl. No. 60/109,417, filed Nov. 18, 1998, Jefferson et al.

Ryo, A., "Auszug aus Handbuch der Informationsverarbeitung," Information Processing Society of Japan, ed., *Information Processing Handbook*, New Edition, Software Information Center, Ohmsha, Dec. 1998, 4 pages. [Translation provided].

Altera, "APEX 20K Programmable Logic Device Family," Altera Corporation Data Sheet, Mar. 2004, ver. 5.1, pp. 1-117.

Chaudhry, G.M. et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 0-7803-1760-2.

Culler, D.E; Singh, J.P., "Parallel Computer Architecture," pp. 434-437, 1999, Morgan Kaufmann, San Francisco, CA USA, XP002477559.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Lange, H. et al., "Memory access schemes for configurable processors," Field-Programmable Logic and Applications, International Workshop, FPL, Aug. 27, 2000, pp. 615-625, XP02283963.

Mei, Bingfeng et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.

Vasell et al., "The Function Processor: A Data-Driven Processor Array for Irregular Computations," Chalmers University of Technology, Sweden, 1992, pp. 1-21.

Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors* 1995, Fremont, CA., pp. 673-698.

Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.

Camilleri, Nick; Lockhard, Chris, *Xilinx Application Note*, "Improving XC4000 Design Performance," XAPP 043.000, 1994, pp. 8-21 through 8-35.

Cartier, Lois, *Xilinx Application Note*, "System Design with New XC4000EX I/O Features," Feb. 21, 1996, pp. 1-8.

Chen, D., (Thesis) "Programmable arithmetic devices for high speed digital signal processing," U. California Berkeley 1992, pp. 1-175.

Churcher, S., et al., "The XC6200 FastMap TM Processor Interface," Xilinx, Inc., Aug. 1995, pp. 1-8.

Cowie, Beth, *Xilinx Application Note*, "High Performance, Low Area, Interpolator Design for the XC6200," XAPP 081, May 7, 1997 (Version 1.0), pp. 1-10.

Duncan, Ann, *Xilinx Application Note*, "A32x16 Reconfigurable Correlator for the XC6200," XAPP 084, Jul. 25, 1997 (Version 1.0), pp. 1-14.

Ebeling, C., et al., "RaPiD—Reconfigurable Pipelined Datapath," Dept. of Computer Science and Engineering, U. Washington, 1996, pp. 126-135.

Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.

Fawcett, B., "New SRAM-Based FPGA Architectures Address New Applications," Xilinx, Inc. San Jose, CA, Nov. 1995, pp. 231-236.

Goslin, G; Newgard, B, *Xilinx Application Note*, "16-Tap, 8-Bit FIR Filter Applications Guide," Nov. 21, 1994, pp. 1-5.

Iwanczuk, Roman, *Xilinx Application Note*, "Using the XC4000 RAM Capability," XAPP 031.000, 1994, pp. 8-127 through 8-138.

Knapp, Steven, "Using Programmable Logic to Accelerate DSP Functions," Xilinx, Inc., 1995, pp. 1-8.

New, Bernie, *Xilinx Application Note*, "Accelerating Loadable Counters in SC4000," XAPP 023.001, 1994, pp. 8-82 through 8-85.

New, Bernie, *Xilinx Application Note*, "Boundary Scan Emulator for XC3000," XAPP 007.001, 1994, pp. 8-53 through 8-59.

New, Bernie, *Xilinx Application Note*, "Ultra-Fast Synchronous Counters," XAPP 014.001, 1994, pp. 8-78 through 8-81.

New, Bernie, *Xilinx Application Note*, "Using the Dedicated Carry Logic in XC4000," XAPP 013.001, 1994, pp. 8-105 through 8-115.

New, Bernie, *Xilinx Application Note*, "Complex Digital Waveform Generator," XAPP 008.002, 1994, pp. 8-163 through 8-164.

New, Bernie, *Xilinx Application Note*, "Bus-Structured Serial Input-Output Device," XAPP 010.001, 1994, pp. 8-181 through 8-182.

Ridgeway, David, *Xilinx Application Note*, "Designing Complex 2-Dimensional Convolution Filters," XAPP 037.000, 1994, pp. 8-175 through 8-177.

Rowson, J., et al., "Second-generation compilers optimize semicustom circuits," Electronic Design, Feb. 19, 1987, pp. 92-96.

Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using a Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996 (Version 1.1), pp. 1-9.
Wilkie, Bill, *Xilinx Application Note*, "Interfacing XC6200 to Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROMless) 16-Bit Mixed Signal Processor," 1992, pp. 1-82.
Defendants' Invalidity Contentions in *PACT XPP Technologies, AG v. Xilinx, Inc., et al.*, (E.D. Texas Dec. 28, 2007) (No. 2:07cv563)., including Exhibits A through K in separate PDF files.
Altera, "APEX 20K Programmable Logic Device Family," Altera Corporation Data Sheet, Mar. 2004, ver. 5.1, pp. 1-117.
XILINX, "Virtex-E 1.8 V Extended Memory Field Programmable Gate Arrays," (v2.2) Sep. 10, 2002, Xilinx Production Product Specification, pp. 1-52.
XILINX, "Virtex-II and Virtex-II Pro X FPGA Platform FPGAs: Complete Data Sheet," (v4.6) Mar. 5, 2007, pp. 1-302.
XILINX, "Virtex-II Platform FPGAs: Complete Data Sheet," (v3.5) Nov. 5, 2007, pp. 1-226.
Altera, "2. TriMatrix Embedded Memory Blocks in Stratix & Stratix GX Devices," Altera Corporation, Jul. 2005, 28 pages.
Altera, "Apex II Programmable Logic Device Family," Altera Corporation Data Sheet, Aug. 2002, Ver. 3.0, 99 pages.

Becker, J., "A Partitioning Compiler for Computers with Xputer-based Accelerators," 1997, Kaiserslautern University, 326 pp.
"BlueGene/L—Hardware Architecture Overview," BlueGene/L design team, IBM Research, Oct. 17, 2003 slide presentation, pp. 1-23.
"BlueGene/L: the next generation of scalable supercomputer," Kissel et al., Lawrence Livermore National Laboratory, Livermore, California, Nov. 18, 2002, 29 pages.
BlueGene Project Update, Jan. 2002, IBM slide presentation, 20 pages.
BlueGene/L, "An Overview of the BlueGene/L Supercomputer," The BlueGene/L Team, IBM and Lawrence Livermore National Laboratory, 2002 IEEE. pp. 1-22.
Epstein, Dave, "IBM Extends DSP Performance with Mfaxt," Microprocessor Report, vol. 9, No. 16 (MicroDesign Resources), Dec. 4, 1995, pp. 1-4 [XL0029013].
Galanis, M.D. et al., "Accelerating Applications by Mapping Critical Kernels on Coarse-Grain Reconfigurable Hardware in Hybrid Systems," Proceedings of the 13th Annual IEEE Symposium on Field-Programmable Custom Computing Machines, 2005, 2 pages.
Guo, Z. et al., "A Compiler Intermediate Representation for Reconfigurable Fabrics," University of California, Riverside, Dept. of Electrical Engineering, IEEE 2006, 4 pages.
Gwennap, Linley, "P6 Underscores Intel's Lead," Microprocessor Report, vol. 9., No. 2, Feb. 16, 1995 (MicroDesign Resources), p. 1 and pp. 6-15.
Gwennap, Linley, "Intel's P6 Bus Designed for Multiprocessing," Microprocessor Report, vol. 9, No. 7 (MicroDesign Resources), May 30, 1995, p. 1 and pp. 6-10.
Hartenstein et al., "Parallelizing Compilation for a Novel Data-Parallel Architecture," 1995, PCAT-94, Parallel Computing: Technology and Practice, 13 pp.
Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.
Huang, Libo et al., "A New Architecture for Multiple-Precision Floating-Point Multiply-Add Fused Unit Design," School of Computer National University of Defense Technology, China, IEEE 2007, 8 pages.
IMEC, "ADRES multimedia processor & 3MF multimedia platform," Transferable IP, IMEC Technology Description, (Applicants believe the date to be Oct. 2005), 2 pages.
Intel, "Pentium Pro Family Developer's Manual , vol. 3: Operating System Writer's Guide," Intel Corporation, Dec. 1995, [submitted in 4 PDF files: Part I, Part II, Part III and Part IV], 458 pages.
Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.
Kanter, David, "NVIDIA's GT200: Inside a Parallel Processor," http://www.realworldtech.com/page.
cfm?ArlicleID=RWT0909891952428&p=1 Sep. 8, 2008, 27 pages.
XILINX, White Paper 370: (Virtex-6 and Spartan-6 FPGA Families) "Reducing Switching Power with Intelligent Clock Gating," Frederic Rivoallon, May 3, 2010, pp. 1-5.
XILINX, White Paper 298: (Spartan-6 and Virtex-6 Devices) "Power Consumption at 40 and 50 nm," Matt Klein, Apr. 13, 2009, pp. 1-21.
U.S. Appl. No. 90/011,087, filed Jul. 8, 2010, Vorbach et al.
Ballagh et al., "Java Debug Hardware Models Using JBits," 8th Reconfigurable Architectures Workshop, 2001, 8 pages.
Bellows et al., "Designing Run-Time Reconfigurable Systems with JHDL," Journal of VLSI Signal Processing 28, 29-45, 2001 Kluwer Academic Publishers, The Netherlands, 2001, pp. 29-45.
Guccione et al., "JBits: Java based interface for reconfigurable computing," Xilinx, Inc, San Jose, CA, 1999, 9 pages.
Price et al., "Debug of Reconfigurable Systems," Xilinx, Inc., San Jose, CA, Proceedings of SPIE, 2000, pp. 181-187.
Sundararajan et al., "Testing FPGA Devices Using JBits," 2001, Proc. MAPLD 2001, Maryland, USA, Katz (ed.), NASA, CA, 2001, 8 pages.
Culler, D.E; Singh, J.P., "Parallel Computer Architecture," p. 17, 1999, Morgan Kauffmann, San Francisco, CA USA, XP002477559.

Short, Kenneth L., *Microprocessors and Programmed Logic*, Prentice Hall, Inc., New Jerse 1981, p. 34.

Webster's Ninth New Collegiate Dictionary, Merriam-Webster, Inc., 1990, p. 332 (definition of "dedicated").

ARM Limited, "ARM Architecture Reference Manual," Dec. 6, 2000, pp. A10-6-A10-7.

Li, Zhiyuan, et al., "Configuration prefetching techniques for partial reconfigurable coprocessor with relocation and defragmentation," International Symposium on Field Programmable Gate Arrays, Feb. 1, 2002, pp. 187-195.

Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.

Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.

Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.

FOLDOC, The Free On-Line Dictionary of Computing, "handshaking," online Jan. 13, 1995, retrieved from Internet Jan. 23, 2011 at http://foldoc.org/handshake.

Li et al., "Hardware-Software Co-Design of Embedded Reconfigurable Architectures," Los Angeles, CA, 2000, ACM, pp. 507-512.

Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.

Melvin, Stephen et al., "Hardware Support for Large Atomic Units in Dynamically Scheduled Machines," Computer Science Division, University of California, Berkeley, IEEE (1988), pp. 60-63.

Pistorius et al., "Generation of Very Large Circuits to Benchmark the Partitioning of FPGAs," Monterey, CA, 1999, ACM, pp. 67-73.

Roterberg, Eric., et al., "Trace Cache: a Low Latency Approach to High Bandwidth Instruction Fetching," Proceedings of the $29^{th}$ Annual International Symposium on Michoarchitecture, Paris, France, IEEE (1996), 12 pages.

Translation of DE 101 39 170 using Google Translate, 10 pages.

Altera, "Implementing High-Speed Search Applications with Altera CAM," Jul. 2001, Ver. 2.1, Application Note 119, 50 pages.

Bolsens, Ivo (CTO Xilinx),"FPGA, a history of interconnect," Xilinx slide presentation, posted on the interact Oct. 30, 2008 at http://www.docstoc.com/docs/2198008/FPGA-a-history-of-interconnect, 32 pages.

\* cited by examiner

LOGIC CELL ARRAY AND BUS SYSTEM

CROSS REFERENCE TO RELATED APPLICATIONS

This application is a continuation of and claims priority to U.S. patent application Ser. No. 10/398,546, filed on Jan. 20, 2004, now U.S. Pat. No. 7,595,659 and claims benefit of and priority to International Application Serial No. PCT/EP01/11593, filed on Oct. 8, 2001, which claims benefit of and priority to U.S. Patent Application Ser. No. 60/238,855, filed on Oct. 6, 2000, the entire contents of each of which are expressly incorporated herein by reference.

FIELD OF THE INVENTION

The present invention relates to logic cell arrays.

BACKGROUND INFORMATION

Logic cell arrays, such as, for example, reconfigurable logic cell arrays include, as particular types, systolic arrays, neuronal networks, multi-processor systems, processors having a number of arithmetic-logic units, and/or logic cells and/or communicative/peripheral cells (I/O), networking and/or network chips, such as crossbar switches, as well as FPGA, DPGA, Xputer, Chameleon chips, etc. The following patents commonly assigned to the assignee of the present application describe logic cell arrays and are incorporated by reference in their entirety: German Patent No. 44 16 881; German Patent No. 197 81 412; German Patent No. 197 81 483; German Patent No. 196 54 846, German Patent No. 196 54 593; German Patent No. 197 04 044; German Patent No. 198 80 129, German Patent No. 198 61 088, German Patent No. 199 80 312; International Patent Application No. PCT/DE 00/01869; German Patent No. 100 36 627, German Patent No. 100 28 397, German Patent No. 101 10 530, German Patent No. 101 11 014, International Patent Application No. PCT/EP 00/10516, and European Patent No. 01 102 674. According to their wide variety, logic cells are herein defined as any cells that contain logic, arithmetic, switches, memory, or peripherals.

In systems such as those previously cited, there are approaches that enable in efficient processing of data which may be implemented in hardware architectures. There nevertheless exists in practical implementations the need to optimize designs, which, in particular, can be structured in a space-saving manner on a wafer and/or can be operated in an energy-saving manner. Additionally, it is desirable to find especially advantageous kinds of operation.

One of the difficulties with conventional systems is that a large number of cells have to communicate with each other. The communication may be required in order to pass the data to be processed from one cell to another. This is the case, for example, if a cell is supposed to further process the results from another cell, e.g., by linking of the result obtained there to results obtained from one or more other cells. Furthermore, communication may be required to transmit status signals.

Busses for transmitting signals to one of a number of possible receivers have been used in this context. Busses are bundles of wires, the number of wires typically being determined from the number of bits to be transmitted together, that is, typically in parallel, plus in some cases a series of status lines.

With conventional simple busses, as are used, for example, in PC's for the communication of plug-in boards with the CPU and/or with each other, the bus lines may be routed to all receivers, and then appropriate control signals transmitted along with them, that is, addressing, ensures that only those receivers respond that are supposed to receive the data. Such a system becomes problematic when a great many communicating units need access to the bus or busses. This is because the communication of data must wait, if necessary, until the bus has been released by other units and/or time-slice solutions must be implemented that grant a transmitting unit only a certain transmission time, which as a rule is independent of whether all data has been transmitted in this time, which might also make it necessary to use a number of time slices for the data transmission. For example, this approach is practiced in systems like the token ring network. In systems like logic cell arrays, in which very rapid communication is desired in order to ensure high data processing speeds, this is an undesirable solution.

It has also been proposed that the busses be segmented. If, for example, in a series of logic cells several units to be connected to each other are disposed close together in pairs, a bus line that passes along all units and consequently is long may be separated by means of switches in order to form several subbus systems. In this context, each segment, like the entire bus, comprises the required number of parallel data lines and the additionally required protocol lines; the communication of a pair of logic cells that are disposed close together does not disrupt the communication of another pair that are disposed close together. In this way, the data rate that is transmitted via the bus system may be substantially increased.

However, this system may not work well when integrated on semiconductor chips, such as in CMOS technology, where the structure is typically complex and the operation is energy inefficient.

SUMMARY

According to example embodiments of the present invention, in a logic cell array having a number of logic cells and a segmented bus system for logic cell communication, the bus system includes different segment lines having shorter and longer segments for connecting two points in order to be able to minimize the number of bus elements traversed between separate communication start and end points.

By configuring the busses using segments of great length that are fashioned as a single line for bypassing long paths in a logic cell array, an especially simple design and an especially efficient operation result. By simultaneously providing short segment lines, it is ensured that all points are addressable as needed.

Each of the segment lines may be formed of a plurality of parallel lines whose number is determined by the bus width and/or the bus protocol. Each segment is therefore formed by a bundle of parallel lines. All lines of a segment may have the same length, so that the lines of a line bundle may all be routed to one and the same end point line, such as a data input of a logic cell, where they may be connected to the input members that are assigned to each of their bits.

According to one example embodiment, data conversion logic cells like arithmetic units have three of the line bundles that are required for the processed bit width to be supplied to them as data supply lines. This permits carrying out a linking of operands A, B, C of the A×B+C type within the cell. This operation is of particular significance in the field of digital signal processing, and the bus structure is therefore especially suitable for logic cell arrays for the construction of real-time configurable DSP arrays.

According to another example embodiment, a logic cell array can perform arithmetically multiplicative linking of operands if at least two of the line bundles for data for the bit width being processed are led out from the cells, in particular with one line bundle for high-order bits and one line bundle for low-order bits. In this way, for a data word width of 32 bits, a 64-bit-wide output is created in order to output the result of a multiplication in full width.

In reconfigurable logic cells, control inputs may be addressable in particular via the segmentable bus system and are disposed in such a manner that at least the logic cell's sequence control signals, such as the signals Reset, Step, Stop, Go and Reload, are transferable into the cell. These trigger and/or enable a reset, a reconfiguration and an activation, respectively. For this purpose a corresponding number of bit lines may be provided. In one embodiment, at least two bit-wide data lines are therefore provided for control signal inputs. Each of the control signals may have a separate signal input assigned to it. Alternatively, an input linking circuit on a several-bit-wide status line may provide for an orderly addressing of the cell. These signal inputs are control signal inputs that can carry the signals that control configuration and/or reconfiguration (flow control signals), such as trigger signals. The actual communication of the cell with the unit or a reconfiguring unit, such as a configuration manager (CT or CM) may thus be achieved by techniques, for example, via the so-called ready/ack/rej protocol, which permits a reconfiguration of the cell only under certain conditions. For the details of this protocol, reference is made to the above-listed patents and additional publicly accessible documents about XPP/VPU architecture.

In the case of rebooting. The bus structure may be designed for this accordingly.

Furthermore, the bus system may be routed to I/O interfaces and/or to external data memories. In other words, the segmentation structure may be used to advantage both inside and outside the logic cell field. I/O interfaces transmit from bus systems that are inside chips to the outside. In this context any bus systems, in some cases alternating in time, are connected for external output and/or input. In addition, the possibility may exist of combining several bus systems in such a manner that they are synchronized with each other. For example, any two output bus systems or an input bus and an output bus together may be synchronized.

In an example embodiment of the bus system, a series of interline elements is provided. Here "line" indicates in particular a first-class conductor, such as a continuous metal line within a semiconductor wafer. "Interline elements" indicate those elements that are disposed between any two lines that are assigned to each other. Interline elements may be connecting switches, in particular the control arrangements that respond to the requirements of logic cells and/or the communication thereof and/or other units; thus, the switch may, for example, open or close at the request of a configuration manager, that is, a unit that configures the logic cell field. This makes it possible to use a compiler to establish how the bus structure is to be designed. In particular the compiler or another configuring or controlling unit is able to determine whether the communication between two cells that are separated is to be accomplished via segment lines having shorter or longer segments, and moreover, if there are a number of longer segments, a preference may also be specified through which one of a multiplicity of segment lines the communication is to occur. In this way, the power loss through the switch may be minimized and/or an optimal adaptation of the data conversion and/or processing to signal propagation times may be provided along the bus lines.

The interline elements may additionally or alternatively include multiplexers in order to feed a signal from a line to one of a series of destinations, such as logic cells, and/or lines that continue further and feed the signal to a multiplicity of destinations, in particular selectable destinations, simultaneously.

Furthermore, registers may be provided as interline elements. These perform different tasks. In this manner data may at first be kept on the bus until a destination is ready to retrieve them. Furthermore, when busses are very long, data processing can be prevented from being properly completed if the long periods of time until the data arrive at the destination when paths are long and (in some cases) the return of the reception confirmation is taken into account. Buffering the data in registers increases the total amount of time (delay) until a data packet traverses the bus, but the interim time until arrival of the data (latency) in which the array or individual cells may not be used meaningfully is reduced. A tradeoff between latency and delay may be required, in which the register is switched in, for example, only under predetermined and/or established conditions, such as very long bus paths. It may then be advantageous if the switching on of the register is controlled, e.g., by a control unit or similar item, like a configuration manager, which in turn is able to operate in response to compiler-generated commands. Furthermore, it may be advantageous to provide a register in order to ensure a synchronous arrival of bits of different significance at a destination point. If busses are fed back, that is, a connection is provided from a cell output to the input of the same cell, registers may be used in such high-frequency feedback loops, to prevent damage to components by the register-imposed delay time.

In a particular implementation, registers may be designed all or in part as additive and/or multiplicative registers; specific links may be implemented without problem and with little circuitry effort, and, thus, the logic cell structure may be relieved on a net basis via shifting of simple linking tasks. In particular, a register may be designed precisely for the purpose of linking two operands algebraically; in busses for transmitting status signals that indicate the status of a logic cell or a series of logic cells and/or trigger a change thereof, that is, in busses for so-called trigger vectors, the registers may preferably be designed to implement Boolean links and/or lookup tables, such as modifiable lookup tables.

Line drivers can also be provided as interline elements.

This may be necessary in particular for multiplex systems that provide a very strong signal fanout.

In an another example embodiment of the present invention, it is possible to provide a change from one segment line having longer segments to a segment line having shorter segments and/or vice-versa along a data transmission path. This permits the provision of roughly equal signal propagation times for the communication of a larger number of cells in the same direction, that is, along the same bus structure, via an appropriate combination of short and long segments, even if buffer registers are provided. The bus structure in this context is comparable to a street that has fast lanes and crawler lanes and enables a lane change at predetermined intermediate positions.

In yet another example embodiment, the bus system may include a multiplicity of parallel segment lines in which several parallel segment lines are provided with longer segments. The longer segments of the segment lines that have longer segments do not all need to be of the same length; a staggered arrangement may be provided.

When there is a greater number of parallel segment lines, the segment line ends and/or interline elements may be disposed within the segment lines at an offset in relation to each other in the bus direction. Typically, interline elements, such as, switches, registers, multiplexers and drivers are provided at the segment line ends or leads. The hardware technology implementation of these elements then requires substantial space, which may be considerable compared to that of the lines to be disposed in the intermediate layers. The offset disposition of these elements then ensures that space has to be provided only for interline element arrays of, for example, two or three segment lines, but not for interline element dispositions of all available segment lines. Also it is possible not to provide drivers or registers for all interline element dispositions, but only to provide them every nth segment end. However, in this case, it is advantageous that at least three segment lines that have longer segments for at least two segment lines have segment line switching circuits, in particular multiplexers provided at predetermined positions as interline elements. In this way, the desired segment change may be configured as required. Segment changes occur at crossings and are possible among segment pairs or segment groups that vary along the bus. It is then possible that the segment line switching circuits for the change from a first to a second segment line are provided at a first position and the segment line switching circuits for the switch from a second to a third segment line at a second position.

In addition to switching by pairs, it is also possible to select, at a position or a multiplicity of positions, among several segment lines to switch to and/or to which data are simultaneously output.

In an additional aspect of the present invention, two-way communication of the cells is possible for the logic cell array. In bus systems having interline elements, such as drivers and/or registers, directions of travel are defined. In order to enable the communication of the cells in two directions, separate bus systems are provided for opposite running directions. At least in one direction, it is once again possible to provide at least two different segment lines with shorter and longer segments, in particular ones that are once again generally parallel.

If the segment lines are separate for the two directions of travel, a register may be provided for at least one direction of travel. As explained above, the register may be provided in the bus system that is routed in the reverse direction, i.e., to that bus system, with which signals may be routed back from an element output to an element input.

According to another aspect of the present invention, a first bus system may be provided for the transmission of data to be processed and a second bus system may be provided for the transmission of status and/or monitoring or control information. One or both bus systems may be formed with segment lines having short and long segments, and the respective bus systems or bus arrays may be configurable separately from each other, or definable in their circuitry and/or regarding the operations in linking registers or the output of lookup tables.

The bus system may be used in a logic cell array in which a plurality of logic cells are arranged adjacent to each other in a row. The longer segments then bypass at least one logic cell. If the logic cell array includes even more logic cells in a row, the longest segments may bypass more than one logic cell.

It should be pointed out that, in at least two-dimensional logic fields having a disposition of logic cells in rows and columns, a segmented bus system may be provided in each row and each column and have the previously described structure having long and short segments in parallel segment lines.

The described bus structure may be advantageous in arrays in which data processing units, such as logic units, are to be linked to each other. However, special advantages are offered if the logic cells are selected from, include and/or form arithmetic-logic units, DPGA's, Kress arrays, systolic processors and RAW machines, digital signal processors (DSP's) that have more than one arithmetic-logic unit, configurable (programmable) logic cells or other cores and/or PAE's, ALU, input/output (I/O) functions and/or memory management units (I/O) and memories. A successful implementation of a bus structure having segment lines that have short and long segments is the VPU/XPP processor unit produced by the applicant.

Such a processor may have a multiplicity of different communicating logic units disposed in an array, the logic units having at least memory storage and data conversion units and the memory units being disposed close to the edge of the array. This makes it possible to have data run through the array and be buffered, if necessary, at the edge in order to bring about reconfiguration as required. The flow may also occur via parallel rows or columns and/or in a meandering way, in order to thereby provide increased computing power.

Additionally, input/output units may be disposed closer to the edge than the storage units. This allows the buffering of data before processing by passing through the array. However, in any case communication of the logic units, at least from edge to edge, for at least one bus system to be provided that is, in particular, segmentable as previously described. Then, data read from a first memory that is close to the edge may be changed as required in a first data conversion unit that is close to this edge, and transferred from there into at least one other data conversion unit in order to carry out further data modifications as required. The data, after flowing through a plurality of data conversion units into a second memory close to the edge may be stored at a position distant from the first memory, and then a reconfiguration of the data conversion units may be carried out for the re-determination of the data conversion, and the data may be routed through at least one part of the data conversion units, possibly in the opposite direction of travel. It may also be provided that the outgoing run is made in a row and the return run in that row or a row situated beneath it in order to take into consideration pipeline effects.

The processor may have at least one programmable gate array (PGA) and several data modification units having ALU's. At least one PGA may be surrounded by other data conversion units, in particular ALU's, in order to be able to obtain data easily for linking purposes and/or output them.

It is possible that, in an array made up of reconfigurable units, several (sub-) arrays, particularly identical ones, are provided that may be brought into communication with each other. For this purpose, each may include a reconfiguration unit that may be designed for reconfiguration of the reconfigurable element of the array. Running inside the array are the bus structures appropriately described above. A configuration manager, which may in particular be disposed on an array side on which no memory units and/or I/O units are provided is thus assigned to each array, the reconfiguration unit may extend over the breadth of the array, which offers the advantage that an optimal chip form may be produced.

A supervising configuration manager which is common to the arrays and which extends in particular over the breadth of more than one array and which is designed for communication with at least several or all of the supervising configuration managers, may also be provided.

Alternatively or additionally, given such a processor having arrays that may be brought into communication with each other, in particular identical ones that have reconfigurable data conversion units, it is possible for the arrays to have switching units (VPAE's) between them that are disposed among the fields for communication switching.

Using such switching units (VPAE's), data and/or control signals (monitoring signals, trigger vectors, etc.) may be transmitted.

The configuration units of at least two of the arrays may be in direct connection with each other. As a result, a supervising configuration unit may be omitted and/or a fault tolerance may be increased. For this purpose, the communication of the configuration units of the at least two arrays that are in direct connection with each other is determined via dedicated fixed lines and/or data lines that are pre-configured, that is, established during bootup.

The switching units (VPAE's) may include two configuration registers, the first configuration register being addressable by the first array and the second configuration register being addressable by the second array. Only if access to the switching units has been permitted for both arrays, is data transmitted accordingly. For this purpose, the first array may permit the insertion of data in the switching unit by appropriate configuration of the first configuration register and signal the insertion of the data to the other configuration units via the dedicated line. Afterwards, the data is retrievable, which is ascertainable by configuration of the second configuration register. A sluice-like transmission of data is enabled by the VPAE's. The separation of a larger array into sub-arrays in other respects generally allows the reduction of the configuration effort to be handled by a configuration unit and as a result may contribute to an efficient array operation that is not impaired by a bottleneck imposed by a configuration unit.

The sub-arrays may be brought into communication with each other via multiple data conversion and/or transfer units (VPAE's) so that no data rate limitation is produced in the data processing.

The geometric hardware may be configured such that the communication-enabling data conversion units are connectable on both sides via busses running along the array, the busses being designed in particular to run past the array edge and there in particular may be routed further to I/O interface units.

As explained above, the processor may include one or more data relaying rule implementation arrangements, in particular a lookup table that are designed to enable relaying of data and in particular data conversion in response to the joint fulfillment of a multiplicity of criteria, in particular event-related criteria. The data to be relayed may in particular be data or trigger vectors that are involved in the reconfiguration and/or reconfigurability of logic cells. The function or the conversion of the relevant data relaying rule implementation arrangement is configured accordingly.

The processor may also be configured using segmented bus structures so that data conversion units and data storage means are provided, at least a few of the data conversion units being locally assigned data storage arrangement and in particular, an arrangement being provided to locally read out data that is locally written into the local data storage arrangement for the further local recent data modification. In other words, interim results may be stored in a logic cell and be further processed along with other data and/or using other links.

If there is a reconfiguration of a cell array made up of logic cells that are reconfigurable while in operation, which allows in particular a reconfiguration in response to the propagation of specific pre-determined data, then one may select whether the reconfiguration occurs in response to the data propagation for all logic cells into which the data that was pre-specified and/or derived therefrom flow and/or only for a part, in particular a processing branch (e.g., an if/then branch), while at least one other branch remains unchanged, which reduces the reconfiguration effort and/or only a sub-chain of a longer row of logic cells, in particular, sequential data-processing ones, is reconfigured, such as up to a predetermined logic cell, and/or in order to permit the reconfiguration immediately or after that data processing or further data processing. This substantially increases the practical use of the wave reconfiguration. It should be mentioned that such a selective wave reconfiguration is possible using only a few commands, in particular, for example, the commands Reset, Step, Stop, Go and Reload. Consequently, the number of trigger inputs or control inputs that are routed to a reconfigurable logic cell, such as a PAE, is small.

The manner in which a logic cell reacts to a specific characteristic data packet in wave reconfiguration is capable of being pre-loadable. This may happen in particular by pre-loading the lookup tables that are provided in the busses. The busses in this context may in part be routed via logic cells and/or formed by and/or with them.

It is possible without any other measures to use the processor array having the bus system of the present invention in order to approximate the behavior of non-linear systems quickly and simply in calculations. This may happen by approximations being determined for one row of working ranges that are adjacent to each other at one temporary working range (n) and at the working ranges that border it below and above ((n−1), (n+1)), the parameters that enable the approximations are pre-loaded, the behavior with the central (n) working range is approximated until that working range is exceeded inside of which the approximation is suitable, then that approximation (n−1) is used for further work which belongs to the working range into which the exceeding proceeded, and the approximation at that working range (n+1) into which the exceeding did not proceed is overwritten using an approximation (n−2) that, together with the previously used approximation (n), encompasses the currently used approximation (n−1) or the accompanying working range. By overwriting that working range in which the operation value is not run, only three variants need to be pre-loaded in order to ensure a rapid further processing after the range is exceeded. Because the overwriting of the preloaded working range happens during the data processing, a constant data computation is possible during a steady transition of the operation values without greater leaps or abrupt changes. It is possible that this manner of approximation may not transferred to multidimensional cases due to operation value encompassing in more than one direction and corresponding overwriting of the intervals that no longer adjoin the current operation value interval after the overwriting of an n-dimensional operation value interval.

DETAILED DESCRIPTION

Figure 1:
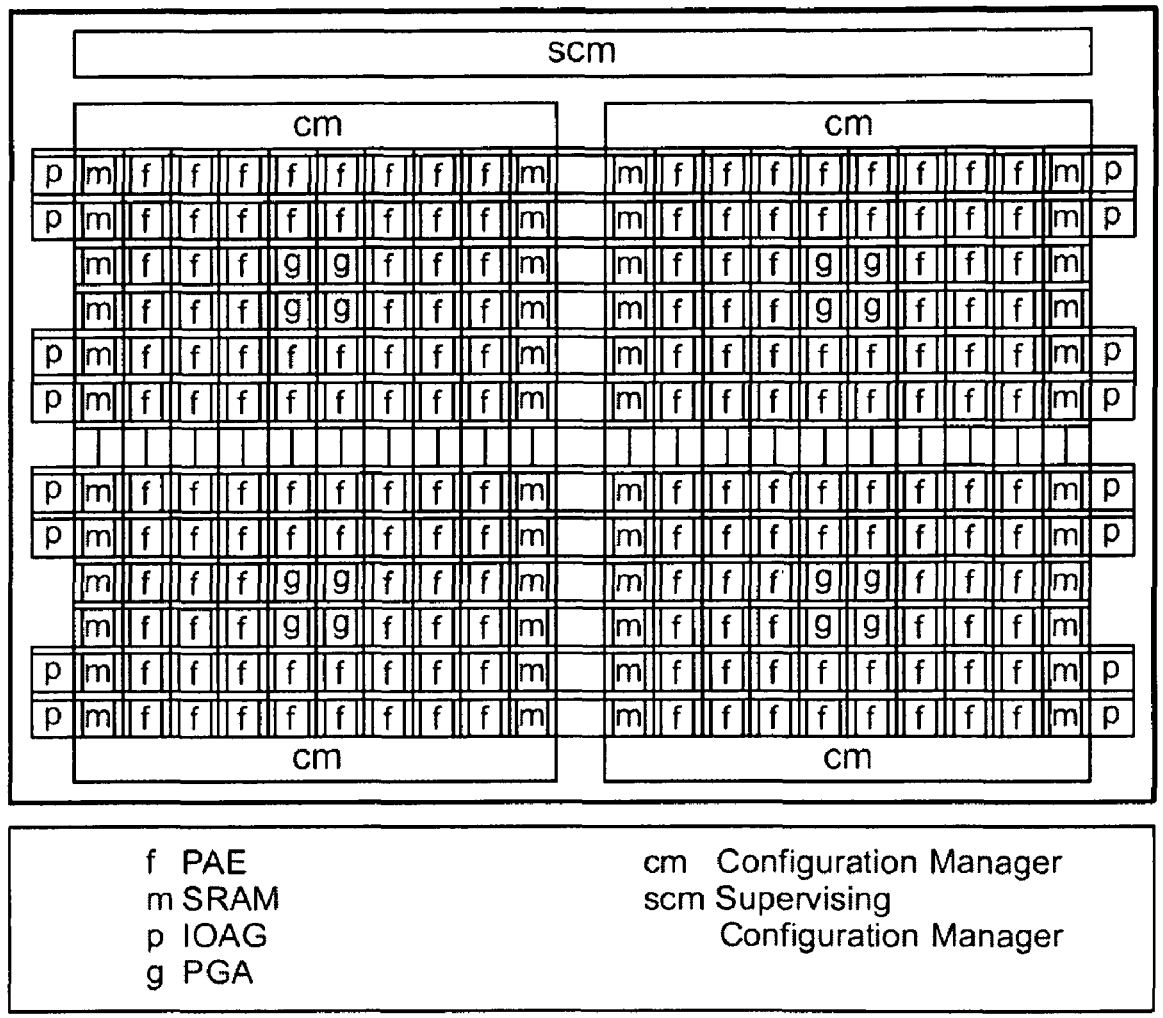
FIG. 1 shows a logic cell array configured in accordance with an example embodiment of the present invention.
Figure 2:
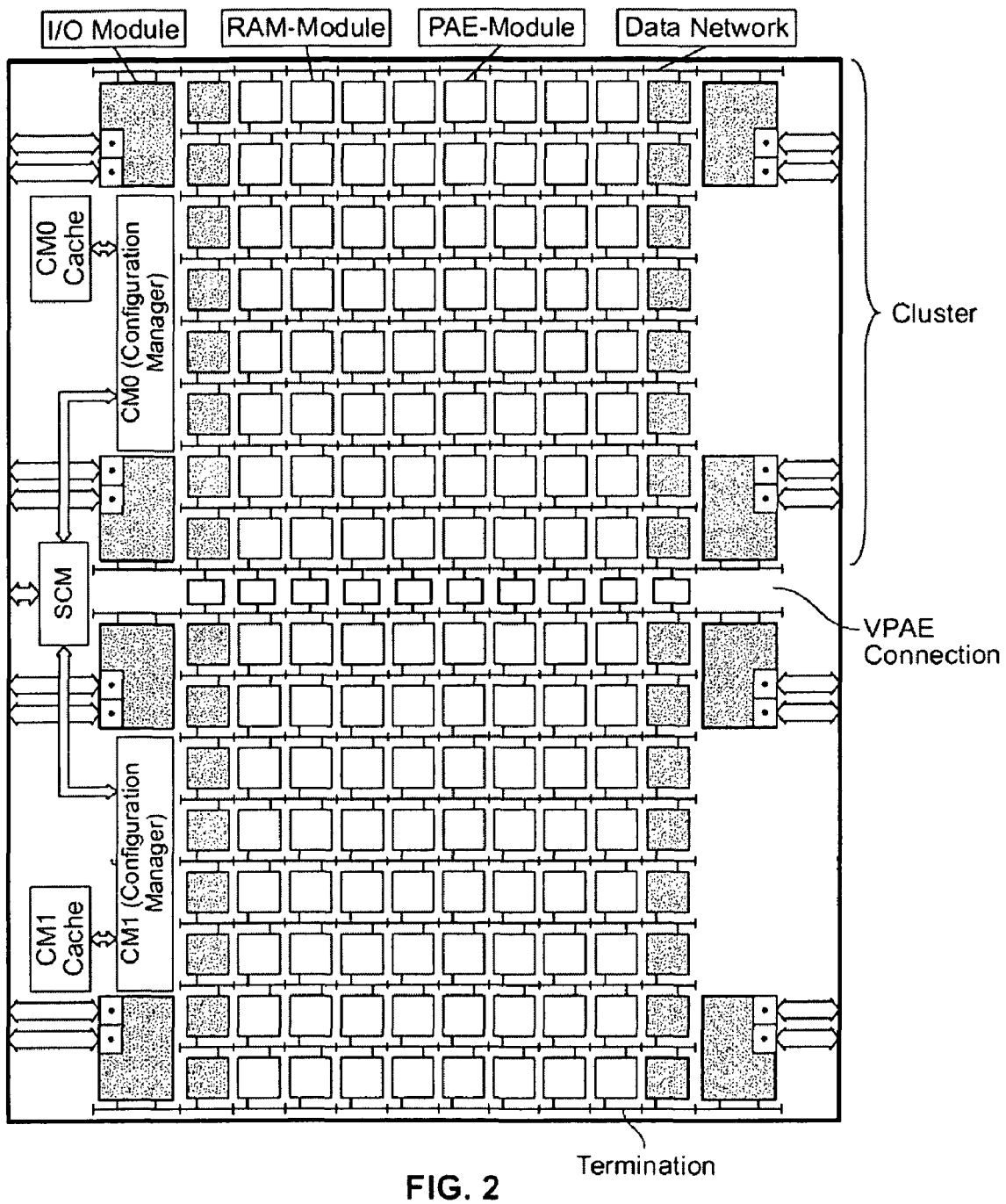
FIG. 2 shows a detailed view of the logic cell array having clusters.
Figure 3:
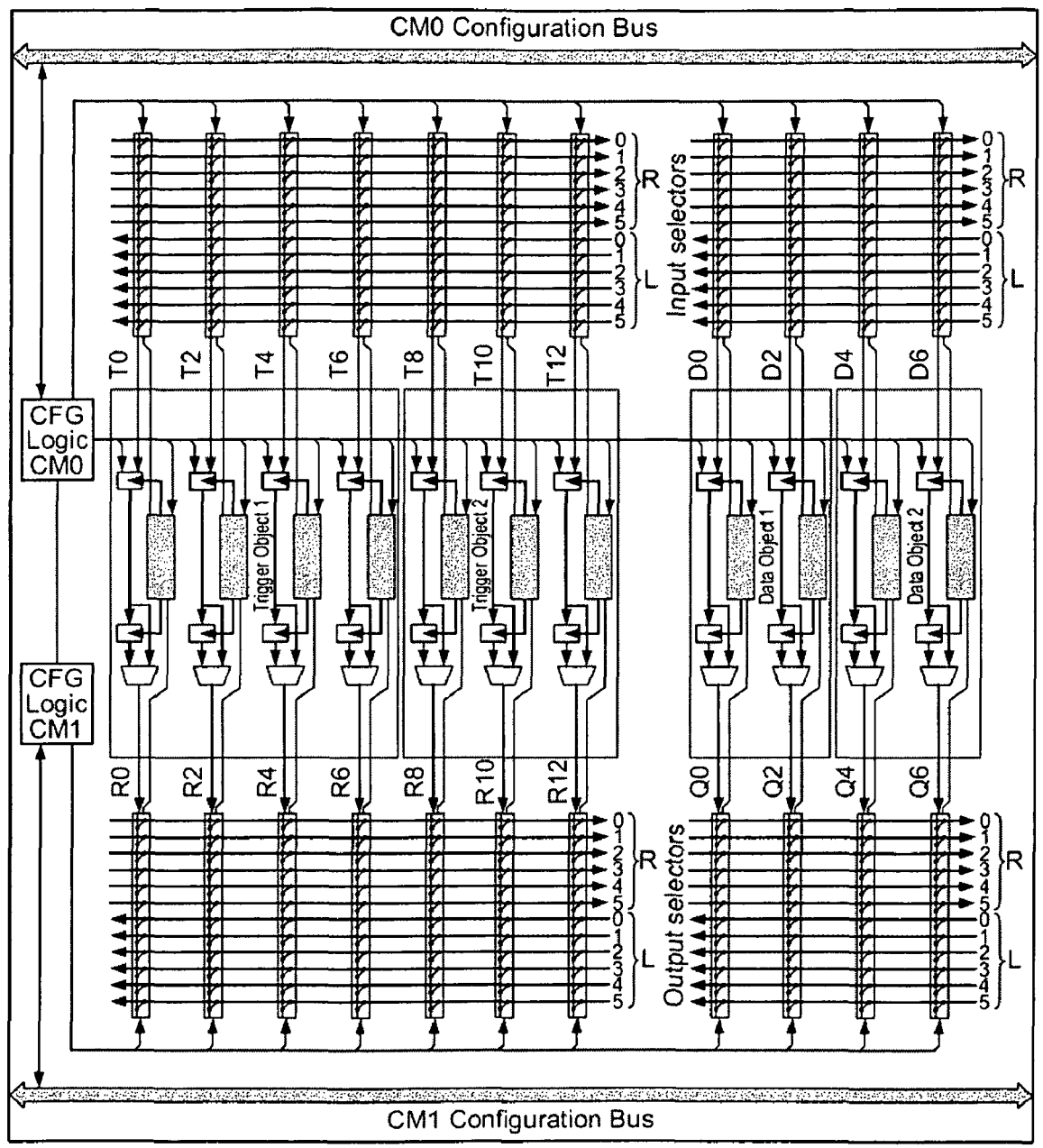
FIG. 3 shows an example for a forward register of a configuration bus according to the present invention.
Figure 4:
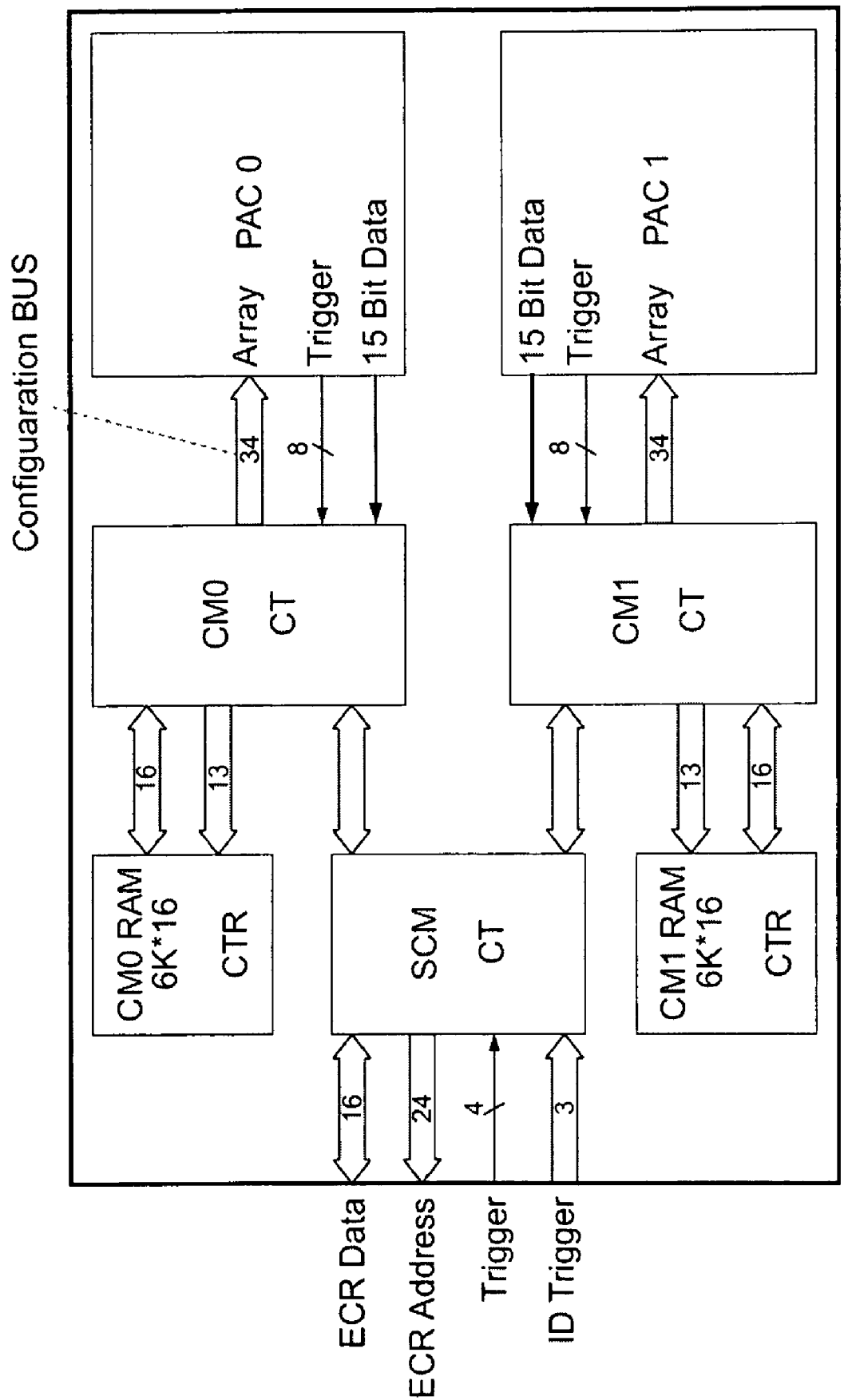
FIG. 4 shows an example embodiment of the hierarchy of configuration managers of a logic cell array according to the present invention.

According to FIG. 1, a processor 1, which may form a unit that may be characterized as an XPP (extreme processing platform), includes two fields or clusters including: a number of arithmetic logic cells (ALU-PAE's=arithmetic logic unit processing array element); memory cells (RAM-PAE's=Random Access Memory processing array element); several illustrated as four input/output cells (I/O elements, input/output processing array element); a bus system running through each field; and a configuration manager that is assigned to the field, these elements together as a cluster forming a unit, which by itself is capable of processing data and doing so as a reconfigurable unit and a higher-order configuration manager being assigned to the two configuration managers (CM) of the cluster in order to form thereby a master cluster or the XPP. It is possible using tree-like hierarchical structures to have more than two fields of processor elements cooperate. In this manner, a higher-order configuration may be placed over more than two configuration managers (CM), which on their part are each assigned to only one individual PAE cluster and/or it may be provided that a multistage configuration manager hierarchy is built up, in which a configuration manager central level is actually assigned to first configuration managers (CM) and in turn is placed under one or more hierarchical levels.

FIG. 1 thus depicts the arrangement of the cells to each other in a two-dimensional matrix and its relative size by way of approximation insofar as the individual cells are disposed very regularly and in particular the PAE's, that is, the memory storage and arithmetic logic cells have approximately the same size, which makes it possible to carry out a page addressing in the generally rectangular and/or regular cell structure having a roughly equal linking to the bus system. The depicted addressing in this context, however, is arbitrary regarding the disposition of memories and arithmetic units in relation to each other, insofar as other dispositions, also involving the I/O cells and/or using still other elements, are possible and are adaptable to a desired special computing task without any further measures. The illustration that is shown is also exemplary in that a three-dimensional disposition of individual cells within the space is also possible, provided that the manufacturing technology of the semiconductor technology that is used permits this.

An individual PAE includes a multiplicity of inputs and outputs. The individual PAE is provided, on the one hand, with data inputs and outputs (A,B,C) and, on the other hand, with control or monitoring inputs and outputs (U,V,W). As is evident from FIG. 1, the PAE's are disposed in horizontal rows, the cells being connected among themselves via a bus system. These horizontal bus systems are connected in the center of the field to the PAE's that are situated above and below them, and to be precise with them only above and below in the depicted example. Thus, the transfer of data and status signals (i.e., control signals) upward and downward is accomplished via the PAE's and, as illustrated in FIG. 1, involves a RAM-PAE or an ALU-PAE. Consequently, all types of PAE's may be connected in the same manner to the bus system and internally wired accordingly. It is also possible to configure the I/O cells for connection to bus lines that are situated one on top of the other, unlike what is depicted).

As a result, the PAE's are used for the relaying of data, that is, for data to be processed as well as control and monitoring data in the vertical direction. The PAE's in this context are configured in such a manner that this relaying may be carried out with or without data modification.

Figure 5:
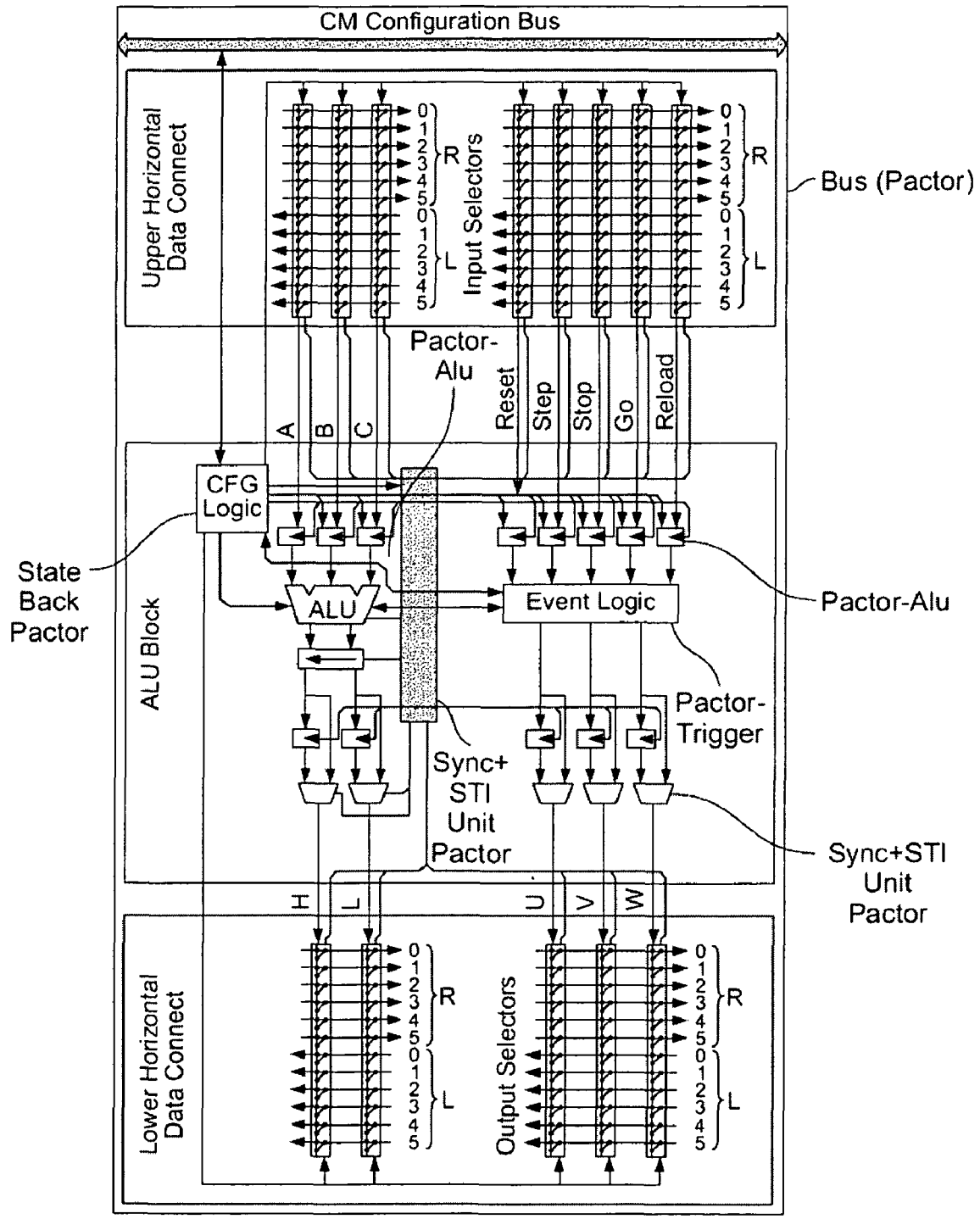
FIG. 5 shows details of a PAE including data according to an example embodiment of the present invention. The three data inputs A B C in the logic cell, the five trigger inputs for the trigger vectors Reset, Stop, Step, GO and Reload, the two data outputs H(igh) and L(ow) as well as the status signal outputs UVW and the bus coupling are depicted.
Figure 6A:
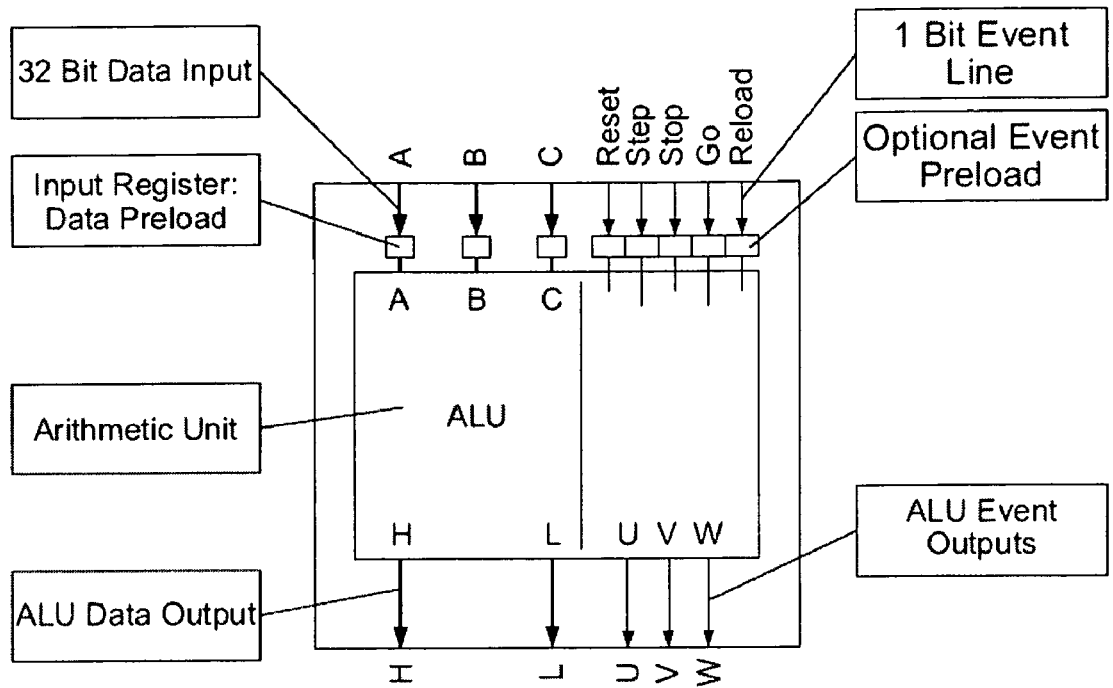
FIG. 6*a* shows the structure of the logic cell in the block diagram according to an example embodiment of the present invention.
Figure 6B:
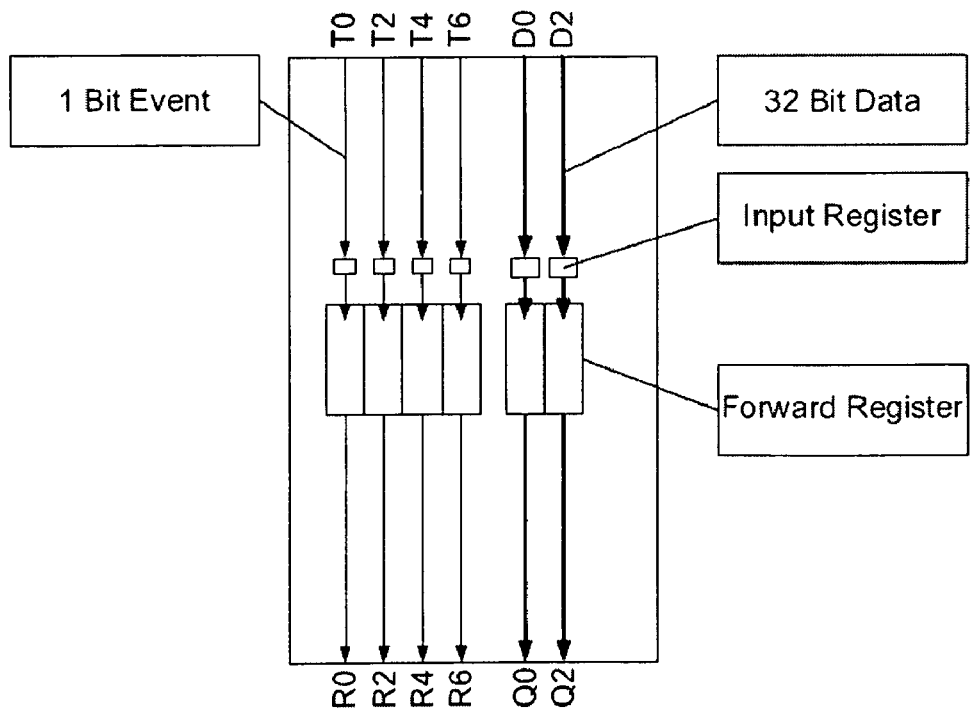
FIG. 6*b* shows the structure of a register according to an example embodiment of the present invention.
Figure 6C:
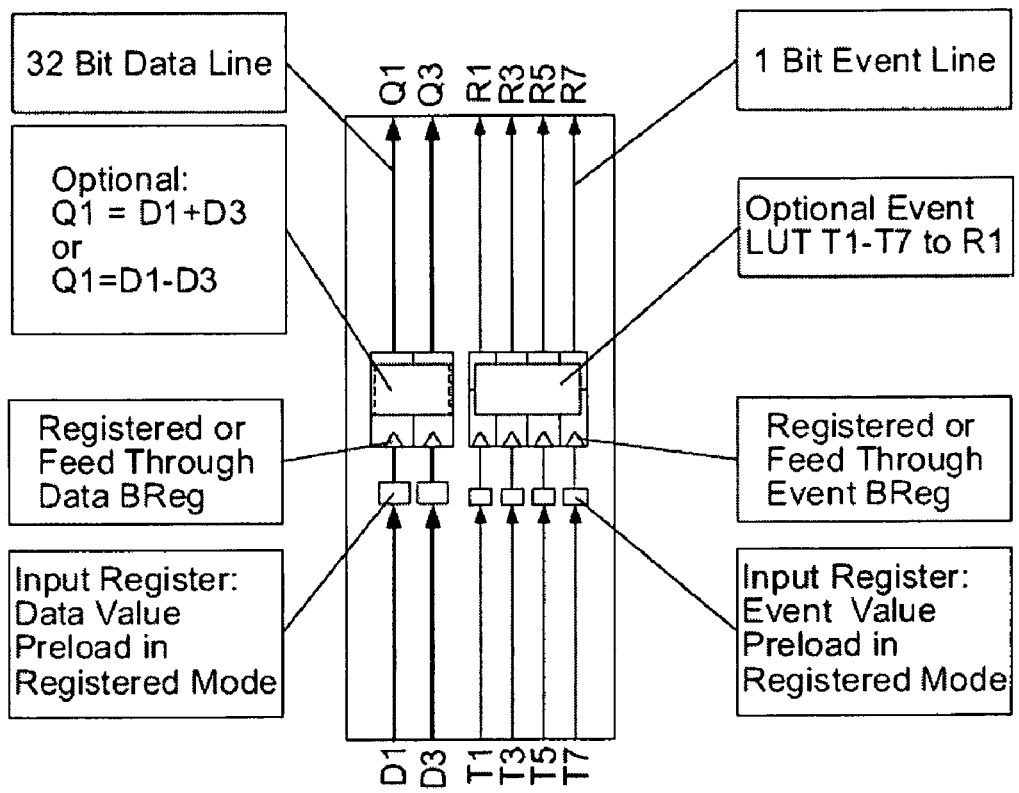
FIG. 6*c* shows the structure of a reverse register for event signals having the optional lookup tables according to an example embodiment of the present invention.
Figure 6D:
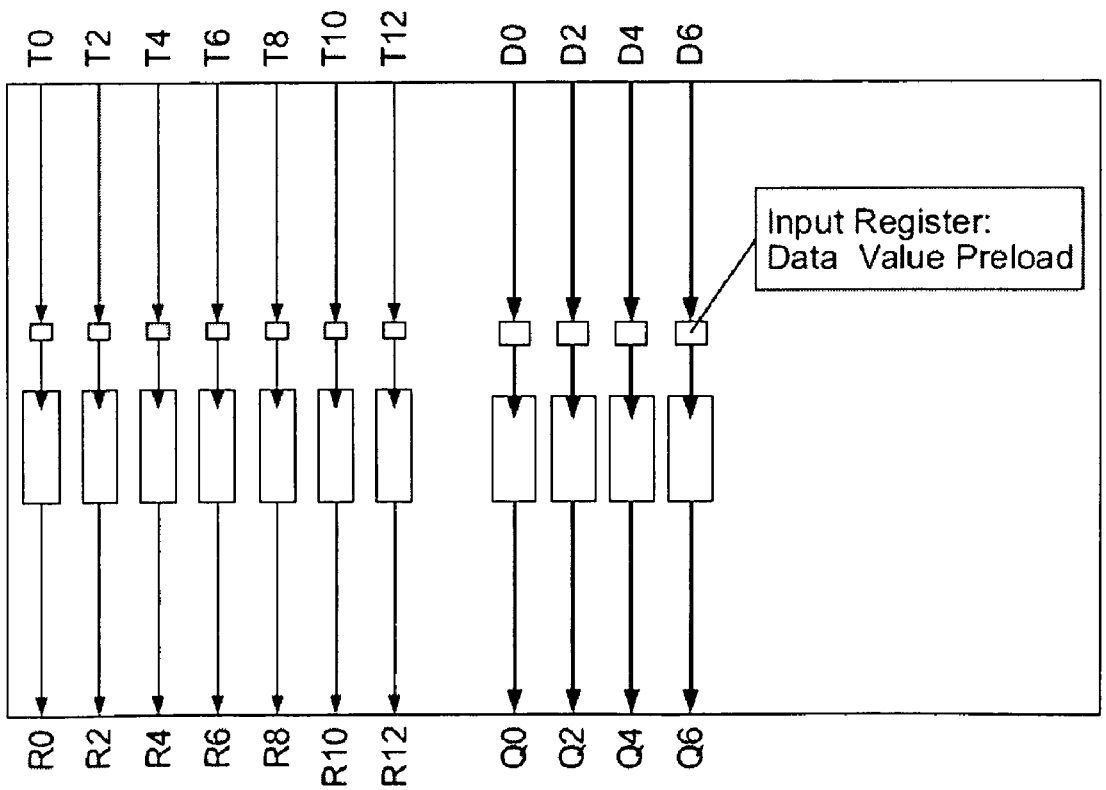
FIG. 6*d* shows a forward register having pre-loading capability according to an example embodiment of the present invention.
Figure 7:
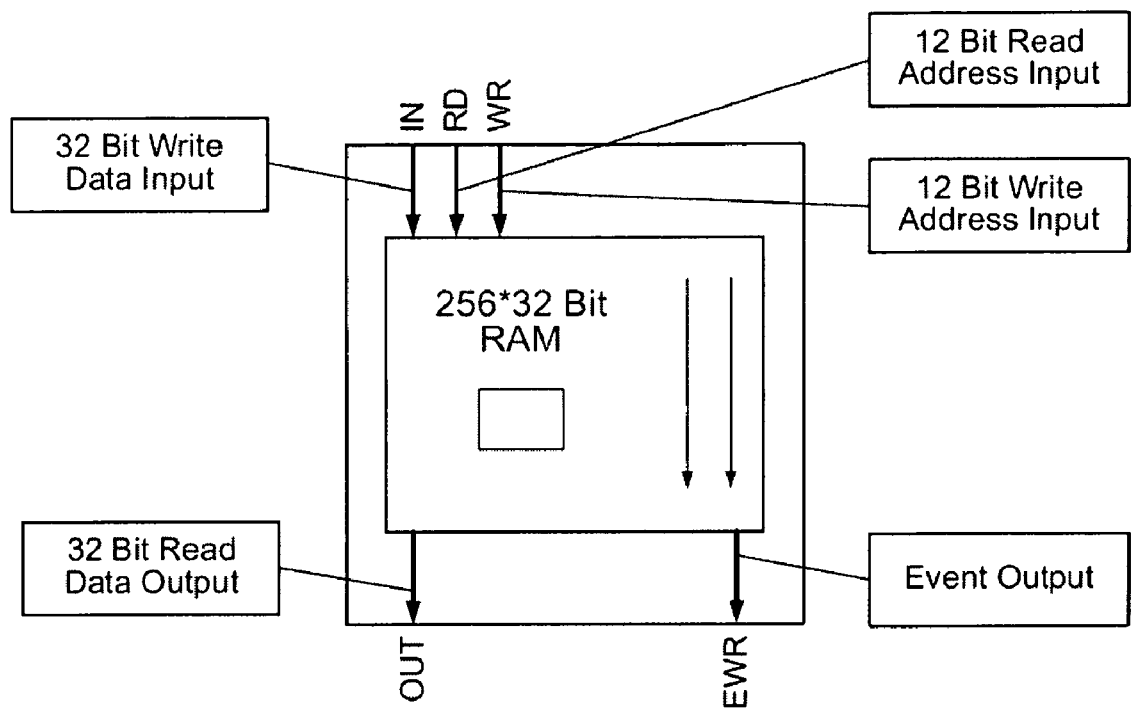
FIG. 7 shows a structure of a memory cell that has an input that is distinguishable from data conversion logic cells and has a correspondingly different required bus width according to an example embodiment of the present invention.
Figure 8:
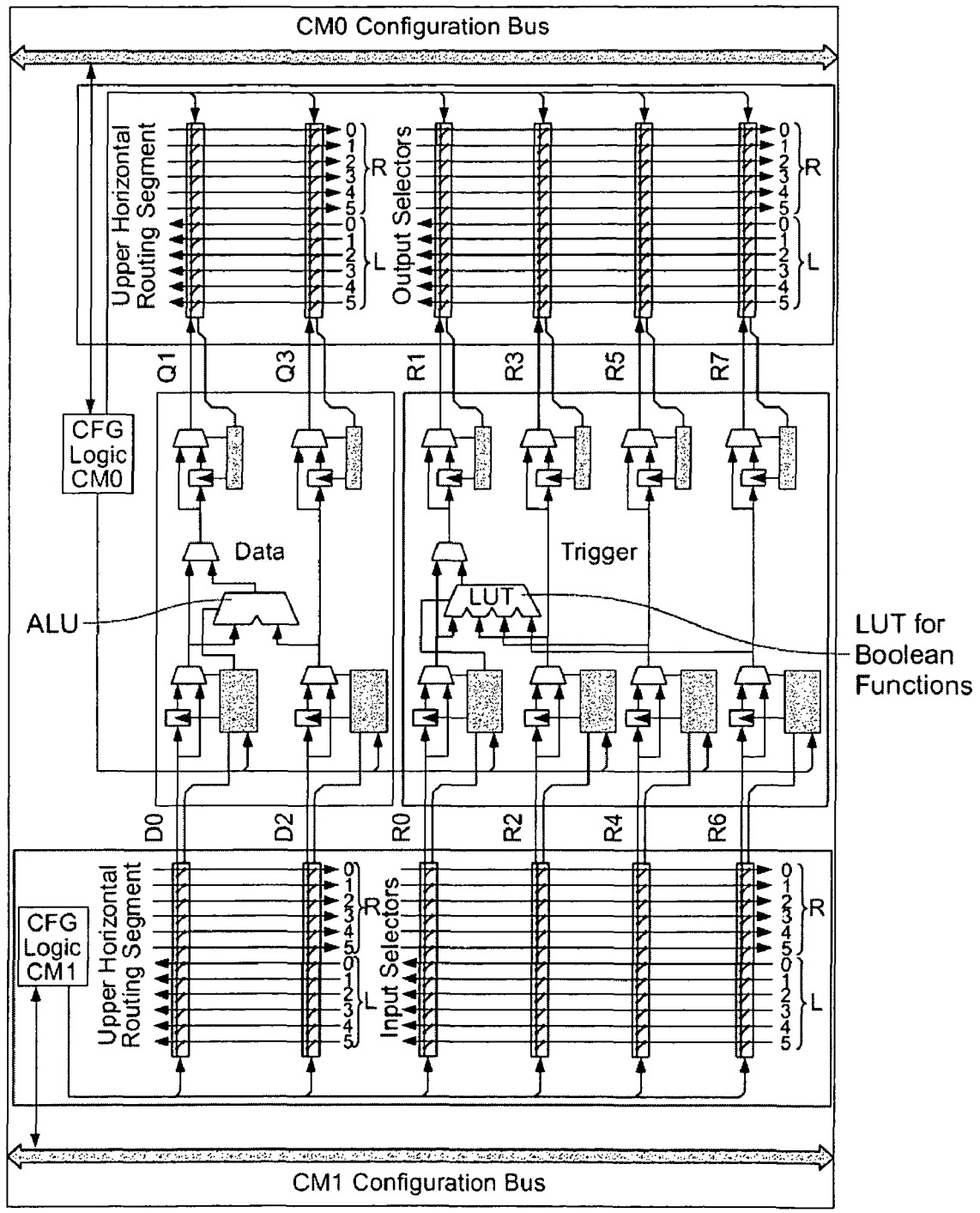
FIG. 8 shows another detailed view of a reverse register in the configuration bus having a lookup table for the implementation of Boolean links from trigger vector bits according to an example embodiment of the present invention.
Figure 9:
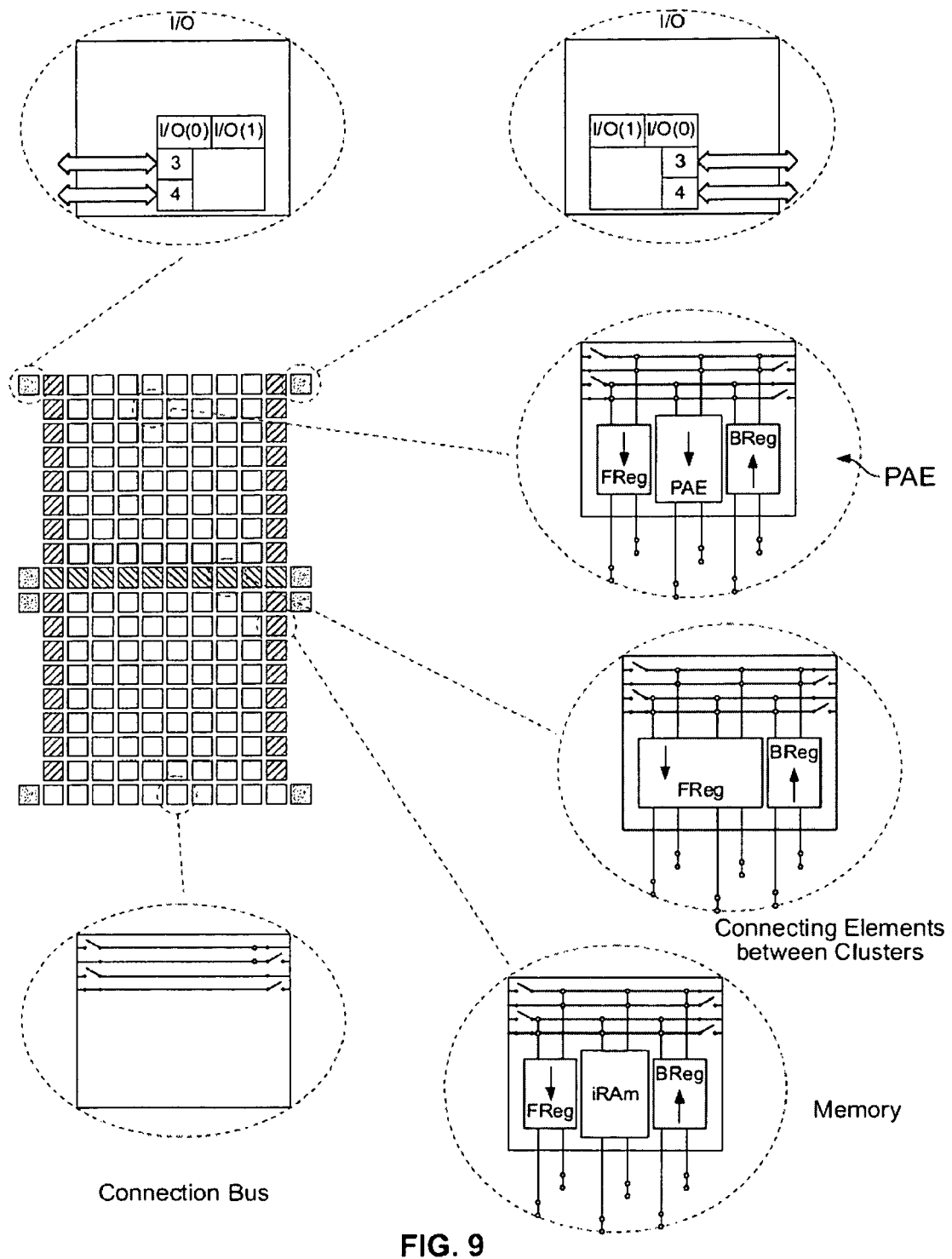
FIG. 9 shows additional processor details, in particular of the busses according to an example embodiment of the present invention.

The data modification may at first be accomplished in the actual functional unit of the PAE, e.g., if it is equipped as an arithmetic-logic unit and the data are linked in the arithmetic logic unit. In order to ensure that data may be supplied sufficiently rapidly to be linked in the cell and bring about an optimal utilization of the cell cycling, three lines A,B,C having the bit width that is able to be processed in the cell are routed to the cell as shown in FIG. 5. In this context, a particular additive input length is also possible that allows determining operations of the type (A+B)+C in a time-efficient and space-efficient manner using the cell results. If no data conversion is required, the data may be passed on to the functional unit. In this way, for example, data that are needed in a row further below are passed through into it without being subjected to a modification in the PAE. In the simultaneous routing of, for example, three data words corresponding to three inputs A, B, C, each may be relayed in different ways. Therefore, it is possible, for example, to relay only the data word to line C unconverted, while A and B are linked to each other in the ALU, for example, by A/B division. Alternatively, two data words may also be rerouted, while a data word in the ALU, for example, is linked to a constant or another value temporarily stored there. The convertibility to other data word amounts that are simultaneously routed to the PAE may also if desired be routed to the PAE as three data words; the individual word in this context has the processor-specific bit width, in the present case, for example, 32 bits.

Any inputs and/or outputs of PAE's may be configured using constants of the configuration unit (CT/CM). In this context, constants may remain unchanged during the entire operation of a configuration, or be overwritten during the operation, that is the execution of a configuration of new data of the configuration unit (CT/CM) and/or other sources, such as PAE's.

Instead of a linking of all or a part of the data as in the case involving PAE's having ALU's specifically in the RAM-PAE's, a complete or partial memorization and/or a complete or partial relaying may occur.

The relaying of the data, furthermore, may occur while bypassing the actual data conversion PAE core unit, like the ALU, in such a manner that a conversion of the data occurs before or during the relaying. This may occur by modifying the data while consulting the lookup tables and other linking units, for example, units that sort the relevant data words according to value. These units may be disposed between the bus coupling and the input into the PAE core unit and configurable in their function, whereupon whether the data are relayed unchanged or not is configurable. If they are not relayed unchanged, but rather changed, how the change occurs within the given possibilities is configured. For the status signal relaying in this context the provision of lookup tables is advantageous, because predetermined output signals may be generated with them in response to predetermined input signals without any additional measures.

Furthermore, the data relaying of unchanged data may be accomplished in a configurable manner immediately or delayed by register. The illustrated individual PAE for this purpose has a configurable, connectable forward register and a configurable, connectable reverse register for the data to be processed and a configurable, connectable forward register and a configurable, connectable reverse register for control data, that is, trigger vectors or status signal and/or control flow data. It is indicated that registers having increased (temporary memory) depth, in particular as FIFO registers, would be foreseeable, precisely in order to temporarily store data on a multi-cycle basis. Assigned to the register in question is a configurable multiplexer with which the register in question may be connected into the data path or removed from it, as desired. The multiplexers are also configurable such that results from the cell may be connected on the bus as desired and required. Therefore, for example, the top and bottom bit word that is obtained in a multiplication are output (H,L) and/or only a result data word (H) is output and a data word relayed and output on the bus, even a desired exchange (A<->H) being configurable. Consequently, a PAE is characterized in the present processor model by a structure that has a central functionality lie an ALU, a RAM and/or, for example, also an FPGA and the additional data relaying functionality, possessing a forward and/or reverse register data relaying functionality comprised of three basic modules, such as FPGA, ALU, RAM and the two (forward/reverse) register data relaying functionality modules, the latter of these being able to implement additional functions. Central functionality in this context does not mean spatial central functionality, but rather functionality in the sense of assigning the central functionality and effect of the particular PAE. The additional functions, which are implemented via the register data relaying functionality modules, include in particular, in the forward register for the data flow, control operations like multiplexing or demultiplexing and copying and/or other manipulations of data. In the reverse register, an ALU functionality may be implemented for the data flow and/or a Boolean linking of event signals, i.e., trigger signals. Thus, the PAE is comprised of modules for the manipulation of data streams, for the operative linking and/or generation of data packets and the processing for the most part via logic linking and generation of event packets.

Figure 10:
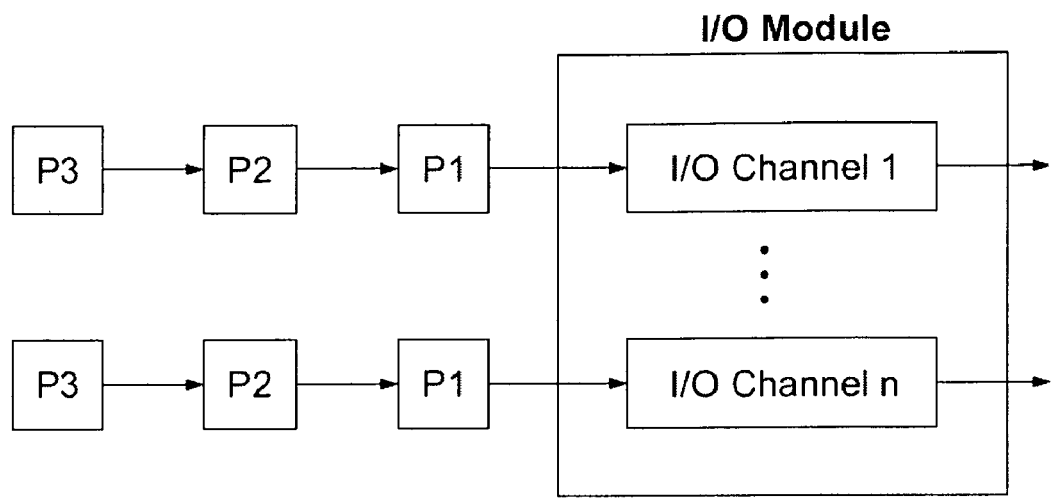
FIG. 10 shows an unsynchronized I/O circuit having two busses according to an example embodiment of the present invention.
Figure 11:
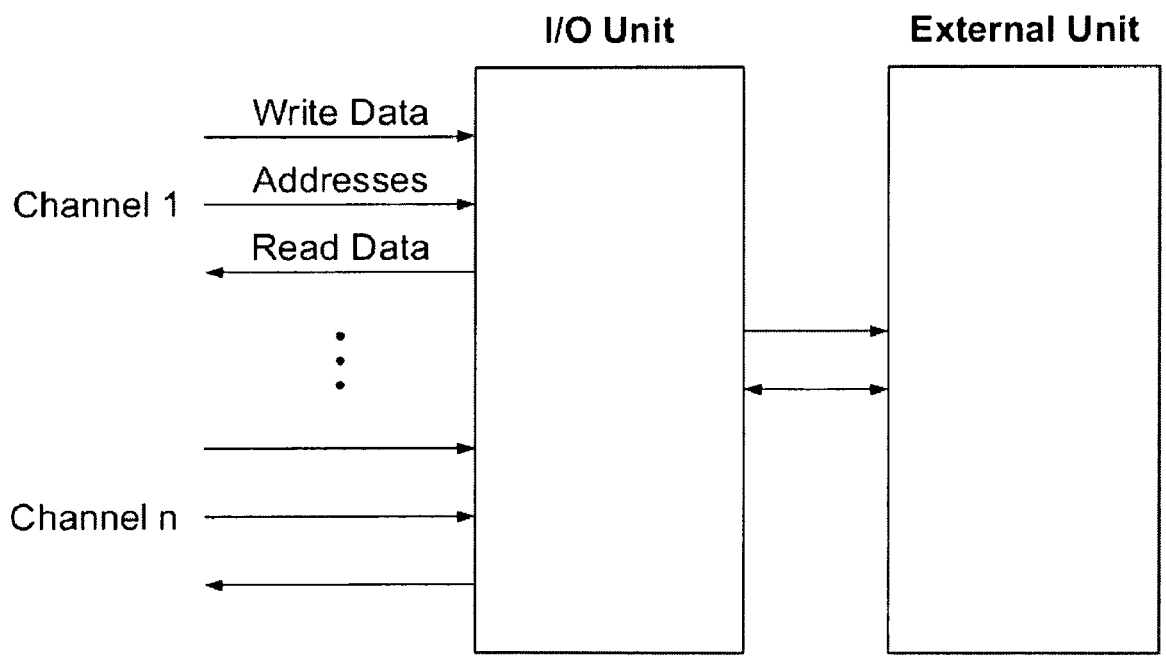
FIG. 11 shows a synchronized I/O circuit having two busses according to an example embodiment of the present invention.

The input/output modules are likewise adapted in their structure in a particular way to the requirements of the data processing task. For this purpose, each of the input/output modules is provided with several channels, that are able to work independently of each other in the so-called PORT mode (FIG. 10) or in synchronization with each other in the so-called RAM mode (FIG. 11). Each I/O module may be used simultaneously by a plurality of algorithms while using a plurality of algorithms, for which sorting algorithms may also be brought in.

In other words, the input/output module (I/O interface) works in memory (RAM) mode (FIG. 11) as an interface to the external memory. In this context, writing data and address data of any channel are synchronized, that is, an external writing operation is started only if both data packets are present. In reading mode, the I/O unit sorts from externally transmitted packets back to the internal channels. The switching between reading and writing mode may occur, for example, via configuration or, for example, via signals.

What is claimed:

1. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements, wherein the RAM elements receive data and address information from the configurable interconnect system and send output data directly to the configurable interconnect system; and
at least one configurable multi-bit IO function unit communicatively coupled to the array.

2. The configurable computing processor chip according to claim 1, wherein the interconnect system is a segmented operand data interconnect system.

3. The configurable computing processor chip according to claim 2, wherein the interconnect system comprises short segments and long segments crossing multiple short segments.

4. The configurable computing processor chip according to claim 1, wherein the at least one configurable multi-bit IO function unit is adapted for allowing interfacing to at least one of a memory and a peripheral.

5. The configurable computing processor chip according to claim 4, wherein at least one of the at least one IO function unit comprises at least a multi-bit write data input and a multi-bit read data output.

6. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements, wherein the RAM elements receive data and address information from the configurable interconnect system and send output data directly to the configurable interconnect system; and
at least one configurable multi-bit IO function unit communicatively coupled to the array;
wherein:
the at least one configurable multi-bit IO function unit is adapted for allowing interfacing to at least one of a memory and a peripheral;

at least one of the at least one IO function unit comprises at least a multi-bit write data input and a multi-bit read data output; and at least one of the at least one IO function unit comprises an arrangement for synchronizing a data transfer.

7. The configurable computing processor chip according to claim 6, wherein at least one of the at least one IO function unit has at least an address interface.

8. The configurable computing processor chip according to any one of claims 6 and 7, wherein at least one of the at least one IO function unit is located physically close to an edge of the array.

9. The configurable computing processor chip according to claim 6, wherein at least one of the plurality of RAM elements has at least one read address input, at least one write address input, at least one data input, and at least one data output.

10. The configurable computing processor chip according to claim 1, wherein at least one of the plurality of RAM elements has at least one read address input, at least one write address input, at least one data input, and at least one data output.

11. The configurable computing processor chip according to claim 1, wherein an ALU of each of at least one of the plurality of ALU elements has at least 3 data inputs at least for processing a multiply-add operation.

12. The configurable computing processor chip according to claim 11, wherein at least one of the plurality of ALU elements comprises at least one registered data input from the configurable interconnect system.

13. The configurable computing processor chip according to claim 12, wherein at least one of the plurality of ALU elements comprises at least one registered data output.

14. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
at least one of the plurality of ALU elements has at least 3 data inputs;
at least one of the plurality of ALU elements comprises at least one registered data input from the configurable interconnect system;
at least one of the plurality of ALU elements comprises at least one registered data output; and
at least one of the plurality of ALU elements comprises multiple input register stages.

15. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
at least one of the plurality of ALU elements has at least 3 data inputs;
at least one of the plurality of ALU elements comprises at least one registered data input from the configurable interconnect system;
at least one of the plurality of ALU elements comprises at least one registered data output; and
the plurality of ALU elements includes an ALU element that comprises at least one output register adapted for receiving a result of said ALU element and connectable for allowing output of the output register to be fed back for further processing within said ALU element.

16. The configurable computing processor chip according to claim 15, wherein at least one of the plurality of ALU elements comprises at least 2 data outputs.

17. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
at least one of the plurality of ALU elements has at least 3 data inputs;
at least one of the plurality of ALU elements comprises at least one registered data input from the configurable interconnect system;
at least one of the plurality of ALU elements comprises at least one registered data output; and
at least one of the plurality of ALU elements comprises at least two status outputs to the interconnect system.

18. The configurable computing processor chip according to claim 17, wherein at least one of the plurality of ALU elements comprises at least one control input from the interconnect system.

19. The configurable computing processor chip according to claim 17, wherein the plurality of ALU elements are arranged in at least one row within the array.

20. The configurable computing processor chip according to any one of claims 1 and 10, wherein the plurality of RAM elements are arranged in at least one row within the array.

21. A configurable computing processor chip comprising:
configurable elements arranged in an array;
at least one configurable multi-bit IO function unit communicatively coupled to the array; and
a configurable interconnect system interconnecting the configurable elements;
wherein:
at least some of the configurable elements are organized in rows within the array, each of the configurable elements inside a row comprising at least one connect into the configurable interconnect system;
the array includes a plurality of programmable gate array (PGA) elements, at least one row of ALU elements and at least two rows of RAM elements; and
the RAM elements receive data and address information from the configurable interconnect system and send output data directly to the configurable interconnect system.

22. The configurable computing processor chip according to claim 21, wherein the interconnect system is a segmented operand data interconnect system.

23. The configurable computing processor chip according to claim 22, wherein the interconnect system comprises short segments and long segments crossing multiple short segments.

24. The configurable computing processor chip according to claim 21, wherein the at least one IO function unit interfaces to at least one of a memory and a peripheral.

25. The configurable computing processor chip according to claim 24, wherein at least one of the at least one IO function unit comprises at least a multi-bit write data input and a multi-bit read data output.

26. A configurable computing processor chip comprising:
configurable elements arranged in an array;
a configurable interconnect system interconnecting the configurable elements; and
at least one IO function unit for interfacing to at least one of a memory that is external to the processor chip and a peripheral device;
wherein:
at least some of the configurable elements are organized in rows within the array, each of the configurable elements inside a row comprising at least one connect into the configurable interconnect system;
the array includes a plurality of gate array (PGA) elements, at least one row of ALU elements and at least two rows of RAM elements, wherein the RAM elements receive data and address information from the configurable interconnect system and send output data directly to the configurable interconnect system;
at least one of the at least one IO function unit comprises at least a multi-bit write data input and a multi-bit read data output; and
at least one of the at least one IO function unit, comprises an arrangement for synchronizing a data transfer.

27. The configurable computing processor chip according to claim 26, wherein at least one of the at least one IO function unit has at least an address interface.

28. The configurable computing processor chip according to any one of claims 26 and 27, wherein at least one of the at least one IO function unit is located physically close to an edge of the array.

29. The configurable computing processor chip according to claim 21, wherein at least one of the RAM elements has at least one read address input, at least one write address input, at least one data input, and at least one data output.

30. The configurable computing processor chip according to claim 21, wherein an ALU of each of at least one of the ALU elements has at least 3 data inputs.

31. The configurable computing processor chip according to claim 30, wherein at least one of the ALU elements comprises at least one registered data input from the configurable interconnect system.

32. The configurable computing processor chip according to claim 31, wherein at least one of the ALU elements comprises at least one registered data output.

33. A configurable computing processor chip comprising:
configurable elements arranged in an array; and
a configurable interconnect system interconnecting the configurable elements;
wherein:
at least some of the configurable elements are organized in rows within the array, each of the configurable elements inside a row comprising at least one connect into the configurable interconnect system;
the array includes at least one row of ALU elements and at least two rows of RAM elements;
at least one of the ALU elements has at least 3 data inputs;
at least one of the ALU elements comprises at least one registered data input from the configurable interconnect system;
at least one of the ALU elements comprises at least one registered data output; and
the ALU elements comprise an ALU element that comprises at least one output register adapted for receiving a result of said ALU element and connectable for allowing output of the output register to be fed back for further processing within said ALU element.

34. The configurable computing processor chip according to claim 33, wherein at least one of the ALU elements comprises at least 2 data outputs.

35. A configurable computing processor chip comprising:
configurable elements arranged in an array; and
a configurable interconnect system interconnecting the configurable elements;
wherein:
at least some of the configurable elements are organized in rows within the array, each of the configurable elements inside a row comprising at least one connect into the configurable interconnect system;
the array includes at least one row of ALU elements and at least two rows of RAM elements;
at least one of the ALU elements has at least 3 data inputs;
at least one of the ALU elements comprises at least one registered data input from the configurable interconnect system;
at least one of the ALU elements comprises at least one registered data output; and
at least one of the ALU elements comprises at least two status outputs to the interconnect system.

36. The configurable computing processor chip according to claim 35, wherein at least one of the ALU elements comprises at least one control input from the interconnect system.

37. A configurable computing processor chip comprising:
configurable elements arranged in an array; and
a configurable interconnect system interconnecting the configurable elements;
wherein:
at least some of the configurable elements are organized in rows within the array, each of the configurable elements inside a row comprising at least one connect into the configurable interconnect system;
the array includes at least one row of ALU elements and at least two rows of RAM elements;
at least one of the ALU elements has at least 3 data inputs;
at least one of the ALU elements comprises at least one registered data input from the configurable interconnect system;
at least one of the ALU elements comprises at least one registered data output; and
at least one of the ALU elements comprises multiple input register stages.

38. The configurable computing processor chip according to claim 9, wherein the plurality of RAM elements are arranged in at least one row within the array.

39. The configurable computing processor chip according to claim 19, wherein the plurality of RAM elements are arranged in at least one row within the array.

40. The configurable computing processor chip according to claim 26, wherein at least one of the RAM elements has at least one read address input, at least one write address input, at least one data input, and at least one data output.

41. The configurable computing processor chip of claim 21, wherein the ALU elements and the RAM elements are some of the configurable elements of the array.

42. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
the interconnect system includes short segments and long segments;
one of the long segments runs parallel to a plurality of sequential short segments; and
a first of the configurable elements is connectable to a second of the configurable elements:
directly via the one of the long segments; and
indirectly, passing through one or more intermediate ones of the configurable elements arranged between the first and second configurable elements, via the plurality of sequential short segments.

43. The configurable computing processor chip of claim 42, wherein the one of the long segments includes at least one switch for passing data to at least one of the plurality of sequential short segments.

44. The configurable computing processor chip of claim 1, wherein the configurable elements are runtime configurable.

45. A configurable computing processor chip comprising:
configurable elements arranged in an array;
at least one configurable multi-bit IO function unit communicatively coupled to the array; and
a configurable interconnect system interconnecting the configurable elements;
wherein:
at least some of the configurable elements are organized in rows within the array, each of the configurable elements inside a row comprising at least one connect into the configurable interconnect system;
the array includes a plurality of programmable gate array (PGA) elements, at least one row that consists of ALU elements and at least two rows of RAM elements; and
the RAM elements receive data and address information from the configurable interconnect system and send output data directly to the configurable interconnect system.

46. The configurable computing processor chip according to claim 45, wherein the interconnect system is a segmented operand data interconnect system.

47. The configurable computing processor chip according to claim 46, wherein the interconnect system comprises short segments and long segments crossing multiple short segments.

48. The configurable computing processor chip according to claim 45, wherein the at least one IO function unit interfaces to at least one of a memory and a peripheral.

49. The configurable computing processor chip according to claim 48, wherein at least one of the at least one IO function unit comprises at least a multi-bit write data input and a multi-bit read data output.

50. A configurable computing processor chip comprising:
configurable elements arranged in an array;
at least one configurable multi-bit IO function unit communicatively coupled to the array; and
a configurable interconnect system interconnecting the configurable elements;
wherein:
at least some of the configurable elements are organized in rows within the array, each of the configurable elements inside a row comprising at least one connect into the configurable interconnect system;
the array includes a plurality of programmable gate array (PGA) elements, at least one row that consists of ALU elements and at least two rows of RAM elements; and
each of at least one of the ALU elements is at least 32-bit wide.

51. A configurable computing processor chip comprising:
configurable elements arranged in an array;
at least one configurable multi-bit IO function unit communicatively coupled to the array; and
a configurable interconnect system interconnecting the configurable elements;
wherein:
at least some of the configurable elements are organized in rows within the array, each of the configurable elements inside a row comprising at least one connect into the configurable interconnect system;
the array includes a plurality of programmable gate array (PGA) elements, at least one row that consists of ALU elements and at least two rows of RAM elements; and
an ALU of each of at least one of the plurality of ALU elements has at least 3 data inputs.

52. The configurable computing processor chip according to claim 45, wherein the at least one configurable multi-bit IO function unit is configurable in at least one of function and interconnection.

53. The configurable computing processor chip according to claim 37, wherein, for the at least one of the plurality of ALU elements having the at least 3 data inputs, an ALU of each of the at least one of the plurality of ALU elements has the at least 3 data inputs.

54. The configurable computing processor chip according to claim 35, wherein, for the at least one of the plurality of ALU elements having the at least 3 data inputs, an ALU of each of the at least one of the plurality of ALU elements has the at least 3 data inputs.

55. The configurable computing processor chip according to claim 33, wherein, for the at least one of the plurality of ALU elements having the at least 3 data inputs, an ALU of each of the at least one of the plurality of ALU elements has the at least 3 data inputs.

56. A configurable computing processor chip comprising:
configurable elements arranged in an array;
a configurable interconnect system interconnecting the configurable elements; and
at least one IO function unit for interfacing to at least one of a memory that is external to the processor chip and a peripheral device;
wherein:
at least some of the configurable elements are organized in rows within the array, each of the configurable elements inside a row comprising at least one connect into the configurable interconnect system;
the array includes a plurality of gate array (PGA) elements, at least one row of ALU elements and at least two rows of RAM elements;
at least one of the at least one IO function unit comprises at least a multi-bit write data input and a multi-bit read data output;
at least one of the at least one IO function unit comprises an arrangement for synchronizing a data transfer; and
each of at least one of the ALU elements is at least 32-bit wide.

57. The configurable computing processor chip according to claim 26, wherein an ALU of each of at least one of the plurality of ALU elements has at least 3 data inputs.

58. The configurable computing processor chip according to claim 26, wherein the at least one IO function unit is configurable in at least one of function and interconnection.

59. A configurable computing processor chip comprising:
configurable elements arranged in an array;
at least one configurable multi-bit IO function unit communicatively coupled to the array; and
a configurable interconnect system interconnecting the configurable elements;
wherein:
at least some of the configurable elements are organized in rows within the array, each of the configurable elements inside a row comprising at least one connect into the configurable interconnect system;
the array includes a plurality of programmable gate array (PGA) elements, at least one row of ALU elements and at least two rows of RAM elements; and
each of at least one of the ALU elements is at least 32-bit wide.

60. The configurable computing processor chip according to claim 21, wherein the at least one configurable multi-bit IO function unit is configurable in at least one of function and interconnection.

61. The configurable computing processor chip according to claim 17, wherein, for the at least one of the plurality of ALU elements having the at least 3 data inputs, an ALU of each of the at least one of the plurality of ALU elements has the at least 3 data inputs.

62. The configurable computing processor chip according to claim 15, wherein, for the at least one of the plurality of ALU elements having the at least 3 data inputs, an ALU of each of the at least one of the plurality of ALU elements has the at least 3 data inputs.

63. The configurable computing processor chip according to claim 14, wherein, for the at least one of the plurality of ALU elements having the at least 3 data inputs, an ALU of each of the at least one of the plurality of ALU elements has the at least 3 data inputs.

64. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
the at least one configurable multi-bit IO function unit is adapted for allowing interfacing to at least one of a memory and a peripheral;
at least one of the at least one IO function unit comprises at least a multi-bit write data input and a multi-bit read data output;
at least one of the at least one IO function unit comprises an arrangement for synchronizing a data transfer; and
each of at least one of the ALU elements is at least 32-bit wide.

65. The configurable computing processor chip according to claim 6, wherein an ALU of each of at least one of the plurality of ALU elements has at least 3 data inputs.

66. The configurable computing processor chip according to claim 6, wherein the at least one configurable multi-bit IO function unit is configurable in at least one of function and interconnection.

67. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein each of at least one of the ALU elements is at least 32-bit wide.

68. The configurable computing processor chip according to claim 1, wherein the at least one configurable multi-bit IO function unit is configurable in at least one of function and interconnection.

69. The configurable computing processor chip according to claim 1, wherein the IO function unit is connected to the configurable interconnect system.

70. The configurable computing processor chip according to claim 1, wherein the IO function unit is connected directly to the configurable interconnect system.

71. A configurable computing processor chip comprising:
configurable elements for configurably processing data, the configurable elements being arranged in an array and being interconnected via a configurable interconnect system, the array comprising:
a plurality of programmable gate array (PGA) elements;
a plurality of dedicated multi-bit ALU elements each having at least one multi-bit adder and one multi-bit multiplier and being configurable in function; and
a plurality of multi-bit configurable RAM elements; and
at least one configurable multi-bit IO function unit communicatively coupled to the array;
wherein:
at least some of the plurality of PGA elements are surrounded by the plurality of multi-bit ALU elements;
the configurable elements are arranged in columns and rows; and
the plurality of multi-bit configurable RAM elements are arranged at edges of the rows.

72. The configurable computing processor chip according to claim 71, further comprising:
a configuration manager that controls configuration of the configurable elements, wherein the configuration manager spans a plurality of the columns.

73. The configurable computing processor chip according to claim 6, wherein the IO function unit is connected to the configurable interconnect system.

74. The configurable computing processor chip according to claim 6, wherein the IO function unit is connected directly to the configurable interconnect system.

75. The configurable computing processor chip according to claim 21, wherein the IO function unit is connected to the configurable interconnect system.

76. The configurable computing processor chip according to claim 21, wherein the IO function unit is connected directly to the configurable interconnect system.

77. The configurable computing processor chip according to claim 26, wherein the IO function unit is connected to the configurable interconnect system.

78. The configurable computing processor chip according to claim 26, wherein the IO function unit is connected directly to the configurable interconnect system.

79. The configurable computing processor chip according to claim 45, wherein the IO function unit is connected to the configurable interconnect system.

80. The configurable computing processor chip according to claim 45, wherein the IO function unit is connected directly to the configurable interconnect system.

81. The configurable computing processor chip according to claim 1, wherein an ALU of each of at least one of the plurality of ALU elements has at least 4 data inputs at least for simultaneously processing two additions and one accumulation.

82. The configurable computer processor chip according to anyone of claims 1, 6, 21, 26, and 45, wherein the RAM elements are addressable on the configurable interconnect system separately from the plurality of multi-bit ALU elements.

* * * * *